(12) United States Patent
Takara et al.

(10) Patent No.: US 6,396,601 B1
(45) Date of Patent: May 28, 2002

(54) SYSTEM FOR MONITORING QUALITY OF OPTICAL SIGNALS HAVING DIFFERENT BIT RATES

(75) Inventors: Hidehiko Takara; Yoshiaki Yamabayashi; Ippei Shake, all of Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/204,001

(22) Filed: Dec. 1, 1998

(30) Foreign Application Priority Data

Dec. 1, 1997 (JP) .............................................. 9-330553
Aug. 14, 1998 (JP) .......................................... 10-229659

(51) Int. Cl.$^7$ .............................................. H04B 10/08
(52) U.S. Cl. ........................ 359/110; 359/124; 359/154
(58) Field of Search ................................ 359/110, 124, 359/154, 173

(56) References Cited

U.S. PATENT DOCUMENTS 5,585,954 A * 12/1996 Taga et al. .............. 359/110 X

OTHER PUBLICATIONS

Hanik et al, "Application of amplitude histograms to monitor performance of optical channels", Electronics Letters, vol. 35, No. 5, pp. 403–404, Mar. 1999.*

Rasztovits–Wiech et al, "Bit error probability estimation algorithm for signal supervision in all–optical networks", Electronics Letters, vol. 35, No. 20, Sep. 1999.*

"Picosecond Optical Sampling Using Four–Wave Mixing In Fibre," Electronics Letters, vol. 27, No. 16, pp. 1440–1441, Aug. 1991.

Takara et al., "Ultra High–Speed Optical Waveform Measurement Method Using Optical Sampling with Sum–Frequency Generation," Proceedings of the IEICE, B–I, J75–B–I, No. 5, pp. 372–379, May 1992.

Bergano et al., "Margin Measurements in Optical Amplifier Systems," IEEE Photonics Technology Letters, vol. 5, No. 3, pp. 304–306, Mar. 1993. (w/ English Abstract).

Takara et al., "100 Gbit/s Optical Signal Eye–Diagram Measurement with Optical Sampling Using Organic Nonlinear Optical Crystal," Electronics Letters, vol. 32, No. 24, pp. 2256–2258, Nov. 1996.

Mueller et al., "Application of Amplitude Histograms for Quality of Service Measurements of Optical Channels and Fault Identification," Proceedings of the ECOC '98 (Madrid, Spain), pp. 707–708, Sep. 1998.

(List continued on next page.)

Primary Examiner—Thomas Mullen
(74) Attorney, Agent, or Firm—Pennie & Edmonds LLP

(57) ABSTRACT

An optical signal quality monitoring system is provided, by which the quality of optical signals can be examined using a single monitoring system, not depending on the bit rate of each signal. In the system, an optical signal having a bit rate $N \cdot f_0$, that is, N times as much as basic clock frequency $f_0$, is sampled by using a pulse repetition frequency $f_0/n_1 - \Delta f$ or $f_0/n_1 + \Delta f$ where $n_1$ is a predetermined natural number and the pulse repetition frequency slightly differs from $f_0/n_1$ by $\Delta f$, and an amplitude histogram of the optical signal is determined based on results of the sampling. Regarding the sampling points which constitute the histogram, a set of higher-level points and a set of lower-level points are extracted and a ratio of a difference between an average level of the set of higher-level points within a predetermined period and an average level of the set of lower-level points within a predetermined period, to the sum of standard deviations of both sets within each predetermined period is calculated as a coefficient of the S/N, and the quality of the optical signal is examined based on the coefficient. By performing optical sampling, quality of optical signals having bit rates of a few dozen Gbit/s or more can be monitored.

20 Claims, 17 Drawing Sheets

OTHER PUBLICATIONS

Shake et al. "Monitoring of Optical Signal Quality Using Sum–Frequency–Generation Optical Sampling," NIST (National Institute of Standards and Technology), Technical Digest Symposium on Optical Fiber Measurements, pp. 87–90, Sep. 1998.

Shake et al., "Optical Signal Quality Monitoring Method Based on Optical Sampling," Electronics Letters, vol. 34, No. 22, pp. 2152–2154, Oct. 1998.

* cited by examiner-

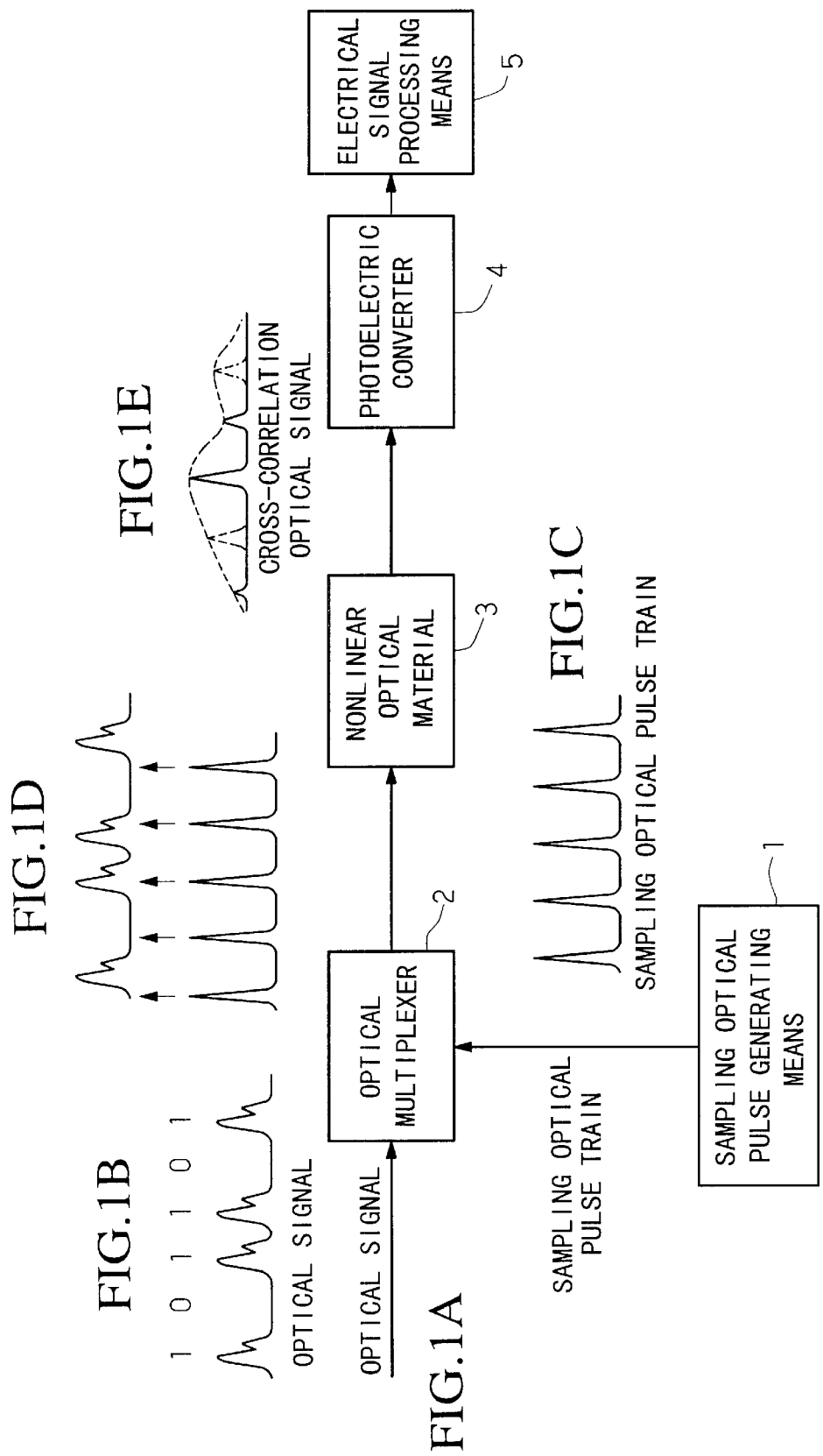

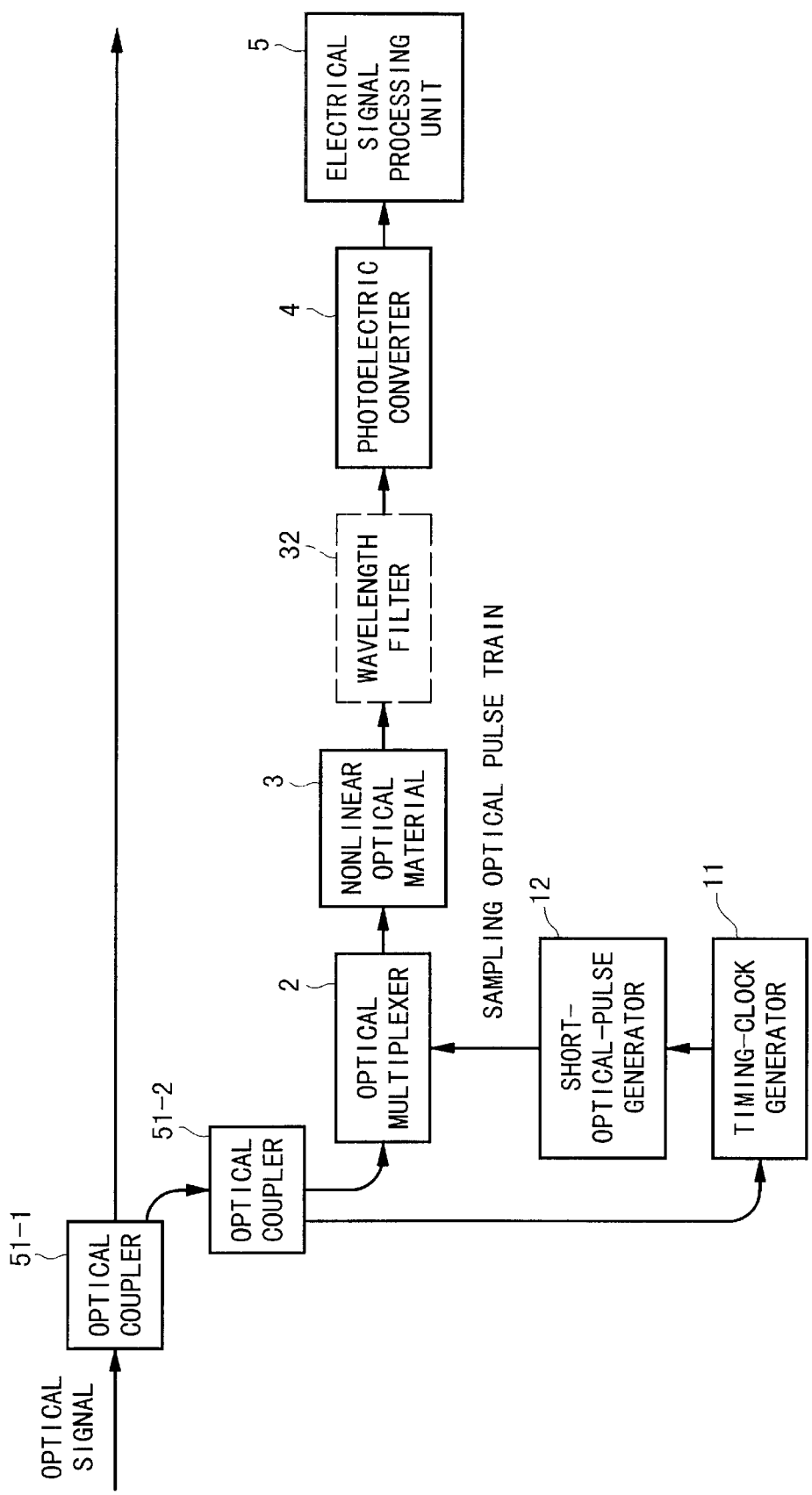

SYSTEM FOR MONITORING QUALITY OF OPTICAL SIGNALS HAVING DIFFERENT BIT RATES

BACKGROUND OF THE INVENTION

1. Field of the Invention

The present invention relates to an optical signal quality monitoring system for monitoring the signal-to-noise ratio (S/N) of digital optical signals having different bit rates, transmitted in an optical fiber transmission network.

This application is based on Patent Applications Nos. Hei 9-330553 and Hei 10-229659 filed in Japan, the contents of which are incorporated herein by reference.

2. Description of the Related Art

In the network hierarchical structure SDH (Synchronous Digital Hierarchy) which was internationally standardized in the 1990s, a parity check called "bit interleave parity (BIP)" is executed between repeaters (this case is called "BIP-8" and is explained later) and also between line terminal multiplexers (this case is called "BIP-N×24"), thereby identifying an erroneous section and obtaining a signal for switching and activating operations. Here, "N" (an integer) relates to the level of the multiplex. With the basic symbol "STM-1" indicating 156 Mbit/s, "STM-N" means the level obtained by multiplying the above level by N. The cases of N=1, 4, 16, and 64 are internationally standardized. In addition, "BIP-M" indicates a parity check for every M bits, and a set of M bits for checking are obtained. At the transmission side, the parity check of parallel M bits of a signal included in a frame is executed, and the checked bits are stored in the next frame and are transmitted with the main signal. At the receiving side, a similar parity check is executed, and a transmission error is detected by collating the checked bits with the above checked bits stored in a specified area in the next frame.

FIG. 18 shows an example of conventional systems for measuring a (bit) error rate. In the figure, a portion of an optical signal through a transmission path is separated and extracted by optical coupler 51-1. The extracted portion is amplified by optical amplifier 52 and is further separated into two portions by optical coupler 51-2. One portion of these two portions is input into clock-extracting circuit 53 so that a clock signal of frequency $f_0$ (i.e., "clock $f_0$") is extracted. The other portion separated by optical coupler 51-2 is input into receiving circuit 54, an output thereof further input into error-rate detecting circuit 55 which consists of a frame detecting circuit, parity checking circuit, and collation circuit. The receiving circuit 54 and error-rate detecting circuit 55 are operated in accordance with the above clock $f_0$ extracted by clock-extracting circuit 53, and the error rate of the optical signal is measured. Here, the clock-extracting circuit 53, receiving circuit 54, and error-rate detecting circuit 55 must have specific structures corresponding to the bit rate of the target optical signal. That is, in order to perform error-rate detection corresponding to plural kinds of bit rates, plural circuits which respectively correspond to the different bit rates are necessary, and thus the error-rate detection cannot be executed using a single circuit based on the conventional technique.

Generally, the error rate of a signal is directly measured in order to evaluate a transmission system. However, if the error rate is very low in this method, a long measuring time is necessary and thus the measuring efficiency is low.

Therefore, regarding a transmission system for receiving binary digital signals, a method for estimating an error rate was presented, in which according to a tendency of error rates obtained when the threshold for a decision circuit is shifted, the error rate at the optimal operating point is estimated (refer to Reference 1: N. S. Bergano, et al., "Margin Measurements in Optical Amplifier Systems", IEEE Photonics Technology Letters, Vol. 5, No. 3, pp. 304–306, March, 1993). FIG. 19 shows a relevant eye diagram of an optical signal and an amplitude histogram indicating light intensity. The threshold of the decision circuit is changed at the time to when the eye-diagram opening is maximum (i.e., the decision point), thereby discriminating between the "High" (or "1" or "MARK") level and the "Low" (or "0" or "SPACE") level in the binary data transmission, and measuring each error rate.

In practice, a measuring system as shown in FIG. 20 is constructed, which consists of clock-extracting circuit 53, photoelectric converter 56, and electrical signal processing means 57, and the Q-factor (as an evaluation index) corresponding to the S/N is calculated based on dependency of the error rate on the threshold. In more detail, a portion of an optical signal extracted from a transmission path is converted into an electrical signal by the photoelectric converter 56, and this electrical signal and a clock (signal) extracted by the clock-extracting circuit 53 are input into electrical signal processing means 57 such as a sampling oscilloscope, so that an eye diagram and an amplitude histogram as shown in FIG. 19 are obtained.

At time $t_0$ when the eye-diagram opening is maximized, with signal amplitude (such as a voltage) $\mu(t_0)$, standard deviation $\sigma_1(t_0)$ of noises at the "MARK" level, and standard deviation $\sigma_0(t_0)$ of noises at the "SPACE" level, the $Q(t_0)$ (i.e., the Q-factor at $t_0$) is represented as follows:

$$Q(t_0)=\mu(t_0)/(\sigma_1(t_0)+\sigma_0(t_0)) \tag{1}$$

On the assumption of a Gaussian distribution of the amplitude of noises, in a low error-rate range, the following relationship between error rate P and the Q-factor is obtained:

$$P=(1/(Q(2\pi)^{1/2})) \exp(-Q^2/2) \tag{2}$$

Therefore, if the Q-factor can be determined, the error rate can be estimated.

However, in the conventional Q-factor measuring system, an optical signal is converted into an electrical signal, and the waveform of the converted signal is sampled so as to determine the Q-factor. Therefore, the possible bit rate of the optical signal is limited to approximately 40 Gbit/s, depending on the range or processing speed of the photoelectric converter and the electrical signal processing circuit.

In addition, the Q-factor at the time when the eye-diagram opening is maximum is measured; thus, the system cannot monitor plural digital optical signals having different bit rates.

Furthermore, in the conventional Q-factor measuring system, a portion of an optical signal to be monitored must be extracted from the transmission path. Therefore, power loss due to the separation of the optical signal transmitted in the transmission path is generated, thereby degrading the S/N.

SUMMARY OF THE INVENTION

Accordingly, the present invention has an objective to provide a system for monitoring the quality of optical signals which are transmitted in an optical fiber transmission network and which have different bit rates, where the S/N of each optical signal can be monitored.

The present invention has another objective to provide a system for monitoring the quality of optical signals having bit rates of a few dozen Gbit/s or more.

The present invention has another objective to provide a system for monitoring the quality of optical signals, by which the effect on the S/N of each optical signal transmitted in a transmission path can be reduced.

Therefore, the present invention provides an optical signal quality monitoring system comprising:

sampling means for sampling an optical signal having a bit rate $N \cdot f_0$, that is, N times as much as the basic clock frequency $f_0$ where N is a natural number, by using a pulse repetition frequency $f_0/n_1 - \Delta f$ or $f_0/n_1 + \Delta f$ where $n_1$ is a predetermined natural number and the pulse repetition frequency slightly differs from $f_0/n_1$ by $\Delta f$; and electrical signal processing means for determining an amplitude histogram of the light intensity of the optical signal based on the results of the sampling, and regarding the sampling points which constitute the histogram, the processing means extracting a set of higher-level points and a set of lower-level points and calculating a ratio of a difference between an average level of the set of higher-level points within a predetermined period and an average level of the set of lower-level points within a predetermined period, to the sum of standard deviations of both sets within each predetermined period, the calculated ratio being a coefficient of the S/N, so as to examine the quality of the optical signal based on the coefficient.

According to this structure, it is possible to sample an optical signal and obtain an amplitude histogram, and to monitor a temporally-averaged coefficient (i.e., a Q-factor) relating to the S/N based on statistically-processed amplitude values of the sampling points of the histogram. That is, the quality of any optical signal can be monitored independantly of the bit rate of the optical signal.

Preferably, the sampling means comprises:

sampling optical pulse generating means for generating a sampling optical pulse train having the pulse repetition frequency $f_0/n_1 - \Delta f$ or $f_0 n_1 + \Delta f$ which slightly differs from $f_0/n_1$ by $\Delta f$;

an optical multiplexer for multiplexing the optical signal and the sampling optical pulse train;

a nonlinear optical material for generating and outputting a cross-correlation optical signal caused by a nonlinear optical effect by using the optical signal and the sampling optical pulse train input from the optical multiplexer so that the optical signal is sampled by the sampling optical pulse train; and a photoelectric converter for converting the cross-correlation optical signal into a cross-correlation electrical signal, and in the monitoring system, the electrical signal processing means determines the amplitude histogram based on the cross-correlation electrical signal.

According to this arrangement, optical sampling with respect to an optical frequency range is performed using optical means; thus, the quality of optical signals having ultra-high speed of a few dozen Gbit/s or more can be examined, which is difficult using the conventional technique. That is, the quality of optical signals having different bit rates within a wide range from 1 Mbit/s to 100 Gbit/s can be monitored using a single monitoring system (or circuit).

For quality monitoring of optical signals having bit rates of approximately a few dozen Gbit/s or less, the coefficient (i.e., Q-factor) of the SAN may be monitored using a structure for performing electrical sampling.

Typically, the sampling means comprises a photoelectric converter for converting the optical signal into an electrical signal, timing-clock generating means for generating a timing-clock signal having the pulse repetition frequency $f_0/n_1 - \Delta f_0/n_1 + \Delta f$ which slightly differs from $f_0/n_1$ by $\Delta f$, and electrical-sampling means for performing sampling of levels of the electrical signal by using the timing-clock signal.

In an optical fiber transmission network which uses optical amplifiers as repeaters, the bit rate of an optical signal can be flexibly selected. The monitoring system according to the present invention can be suitably applied to such a network. In addition, by selecting a suitable bit rate within a possible range in which the sampling optical pulse generating means can normally operate, the present invention can be applied to a transmission path for a signal, based not only on the network hierarchical structure SDH but also on another network hierarchical structure PTH (Presynchronous Digital Hierarchy).

It is possible for the optical multiplexer to comprise polarization-splitting and multiplexing means for splitting the optical signal into two orthogonal polarization components Psig. p and Psig. s and also splitting the sampling optical pulse train into two orthogonal polarization components Psam. p and Psam. s, and for polarization-multiplexing orthogonal components Psig. s and Psam. p with each other, and also polarization-multiplexing orthogonal components Psig. p and Psam. s with each other, and outputting the multiplexed signals from two output ports, and that regarding the dual polarization-multiplexed signals, cross-correlation optical signals are respectively generated and these signals are then synthesized. Accordingly, it is possible to remove polarization dependency in which the power of the cross-correlation optical signal changes in accordance with the polarization state of the input optical signal.

It is also possible to insert the optical multiplexer and the nonlinear optical material into the transmission path through which the optical signal is transmitted; to multiplex the optical signal from the transmission path and the sampling optical pulse train output from the sampling optical pulse generating means by the optical multiplexer and to input the multiplexed signal into the nonlinear optical material; with the monitoring system comprising wavelength-division demultiplexing means, inserted into the transmission path, for demultiplexing the optical signal and the cross-correlation optical signal output from the nonlinear optical material, and outputting the separated optical signal into the transmission path and outputting the separated cross-correlation optical signal into the photoelectric converter.

According to this arrangement, power loss of the optical signal transmitted through the transmission path can be reduced.

BRIEF DESCRIPTION OF THE DRAWINGS

FIG. 1A shows a typical basic arrangement of the optical signal quality monitoring system according to the present invention, and FIGS. 1B–1E show waveforms of each relevant signal.

FIG. 8 is a block diagram showing the first embodiment of the optical signal quality monitoring system according to the present invention.

DESCRIPTION OF THE PREFERRED EMBODIMENTS

Hereinbelow, embodiments according to the present invention will be explained.

FIG. 1A shows a typical basic arrangement of the system for monitoring the quality of optical signals according to the present invention.

In the figure, an optical signal (the waveform thereof is shown in FIG. 1B) input from a transmission path is characterized by optical frequency $\omega_{sig}$ and bit rate $N \cdot f_0$ (bit/s) which is N (natural number: 1, 2, ...) times as much as basic clock frequency $f_0$ (Hz). The sampling optical pulse generating means 1 generates sampling optical pulses (the waveform of the generated pulse train is shown in FIG. 1C) of optical frequency $\omega_{sam}$, and pulse repetition frequency $f_0/n_1-\Delta f$ (Hz) or $f_0/n_1+\Delta f$ (Hz) ($n_1=1, 2, \ldots$ (natural number)) obtained by subtracting offset frequency $\Delta f$ from $f_0/n_1$ or by adding offset frequency $\Delta f$ to $f_0/n_1$. Here, the pulse width $\Delta\tau$ is sufficiently narrower than the time slot of the optical signal (i.e., $\Delta\tau \ll 1/Nf_0$). Optical multiplexer 2 multiplexes the optical signal and the sampling optical pulses (refer to FIG. 1D) and the multiplexed signal is input into nonlinear optical material 3.

Using the nonlinear optical material 3, the following operations are possible: (i) SFG (sum-frequency generation), a second-order nonlinear optical effect (refer to Reference 2: H. Takara, et al, "Ultra High-Speed Optical Waveform Measurement Method Using Optical Sampling with Sum-Frequency Generation", Proceedings of IEICE, B-I, Vol. J75-B-I, No. 5, pp. 372–380, 1992), (ii) DFG (difference-frequency generation), also a second-order nonlinear optical effect, and (iii) FWM (four-wave mixing), a third-order nonlinear optical effect (refer to Reference 3: P. A. Andrekson, "PICOSECOND OPTICAL SAMPLING USING FOUR-WAVE MIXING IN FIBRE", Electronics Letters, Vol. 27, No., 16, pp. 1440–1441, 1991). Therefore, the nonlinear optical material 3 generates a cross-correlation optical signal (the waveform thereof is shown in FIG. 1E) of the optical signal and the sampling optical pulses.

Figure 2A:
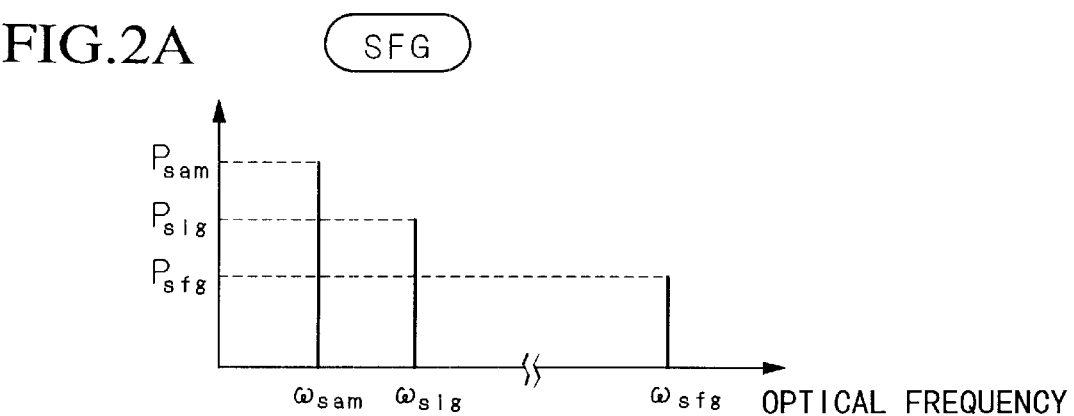
FIGS. 2A–2C respectively show the relationships between the optical frequencies of the relevant input and output signals for the SFG, DFG, and FWM.
Figure 2B:
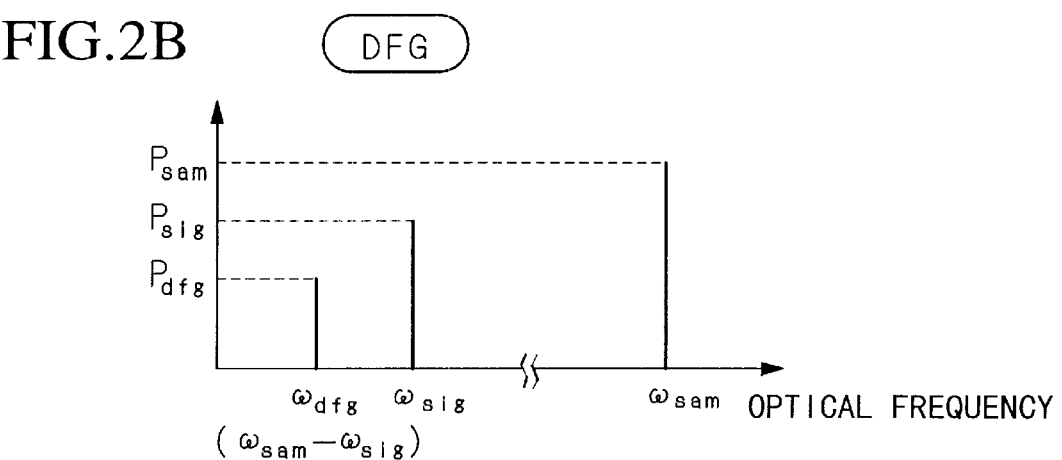
Figure 2C:
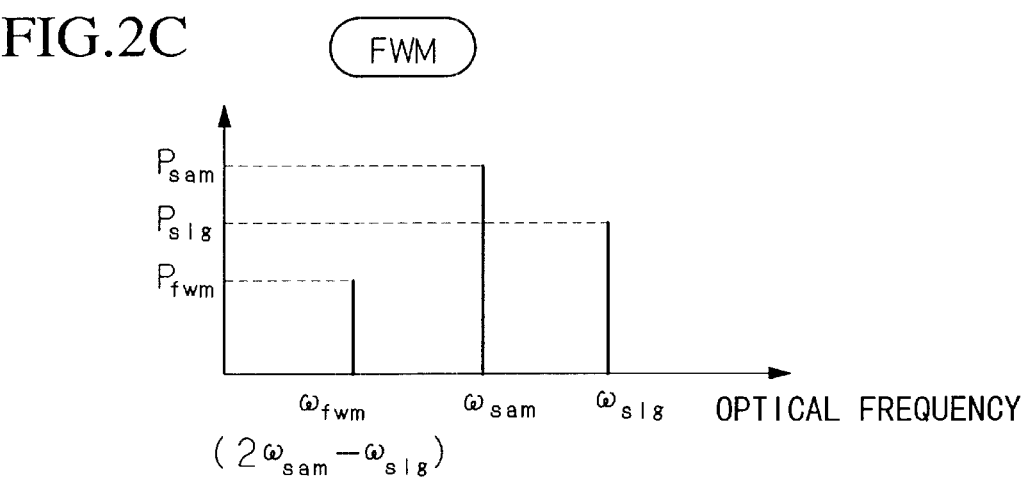

FIGS. 2A–2C respectively show relationships between optical frequencies of input and output signals in each case of SFG, DFG, and FWM. In SFG, as shown in FIG. 2A, when two optical waves of an optical signal of optical frequency $\omega_{sig}$ and a sampling optical pulse train of frequency $\omega_{sam}$ are input into a second-order nonlinear optical material, an optical signal having "sum" optical frequency $\omega_{sfg}$ ($=\omega_{sam}+\omega_{sig}$) is generated.

In DFG, as shown in FIG. 2B, when two optical waves of an optical signal of optical frequency sig and a sampling optical pulse train of frequency ($\omega_{sam}$ are input into a second-order nonlinear optical material, an optical signal having the "difference" optical frequency $\omega_{dfg}$ ($=\omega_{sam}-\omega_{sig}$) is generated.

Generally, the FWM means a phenomenon in which from three input optical signals (optical frequencies: $\omega_1$, $\omega_2$, and $\omega_3$), a new optical signal (optical frequency: $\omega_4=\omega_1+\omega_2-\omega_3$) is generated. Here, when this phenomenon is applied to the optical sampling, a complicated arrangement is necessary for using three kinds of optical signals; thus, degeneracy of two optical waves (i.e., $\omega_1=\omega_2$) is generally used in the FWM. That is, a sampling optical pulse train of optical frequency $\omega_{sam}$ (as $\omega_1$ and $\omega_2$) and an optical signal of optical frequency $\omega_{sig}$ (as $\omega_3$) are input, thereby generating an optical signal of optical frequency $\omega_{fwm}$ ($=2\omega_{sam}-\omega_{sig}$) as shown in FIG. 2C.

Here, the pulse repetition frequency of the sampling optical pulses is smaller than $f_0/n_1$ ($f_0$ being the basic clock frequency of the optical signal) by $\Delta f$; thus, the sweep of the sampling optical pulses is performed while the relative position of each pulse with respect to the optical signal shifts. As a result, the waveform of the cross-correlation optical signal is changed as shown in FIG. 1E, and the envelope of the waveform has a waveform obtained by expanding the waveform of the input optical signal along the time axis. The cross-correlation optical signal is detected by a light-receiving system, thereby measuring an amplitude histogram of a high-speed optical signal (refer to the above Reference 2).

Figure 3:
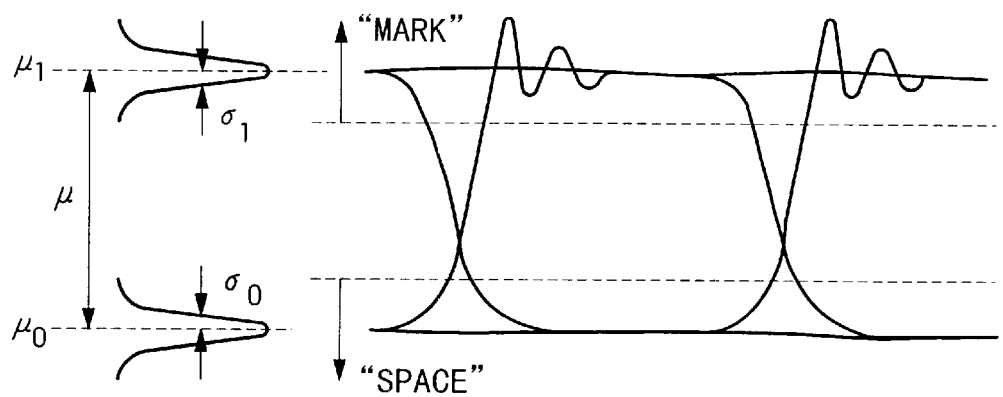
FIG. 3 is a diagram for explaining a method of setting levels with respect to the amplitude histogram measured by the electrical signal processing means.

Specifically, the cross-correlation optical signal is converted into an electrical signal by photoelectric converter 4, and the converted signal is input into electrical signal processing means 5. In the electrical signal processing means 5, the peak values of the cross-correlation optical signal are detected and analyzed so that an amplitude histogram as shown in FIG. 3 is obtained. Among the sampling points which constitute the histogram, it is determined that a set of points whose levels are higher than a predetermined threshold level $\mu_{th1}$ belongs to level (section) "MARK" (i.e., "1"), while a set of points whose levels are lower than a predetermined threshold level $\mu_{th0}$ belongs to level (section) "SPACE" (i.e., "0"), and that a coefficient corresponding to the S/N is defined as:

$$Q=\mu/(\sigma_1+\sigma_0) \qquad (3)$$

Where $\mu$ is the difference between average $\mu_1$ of levels belonging to "MARK" within a predetermined period and average $\mu_0$ of levels belonging to "SPACE" within a predetermined period, and $\sigma_1$ and $\sigma_0$ are standard deviations of both "MARK" and "SPACE" in each predetermined period.

Figure 4:
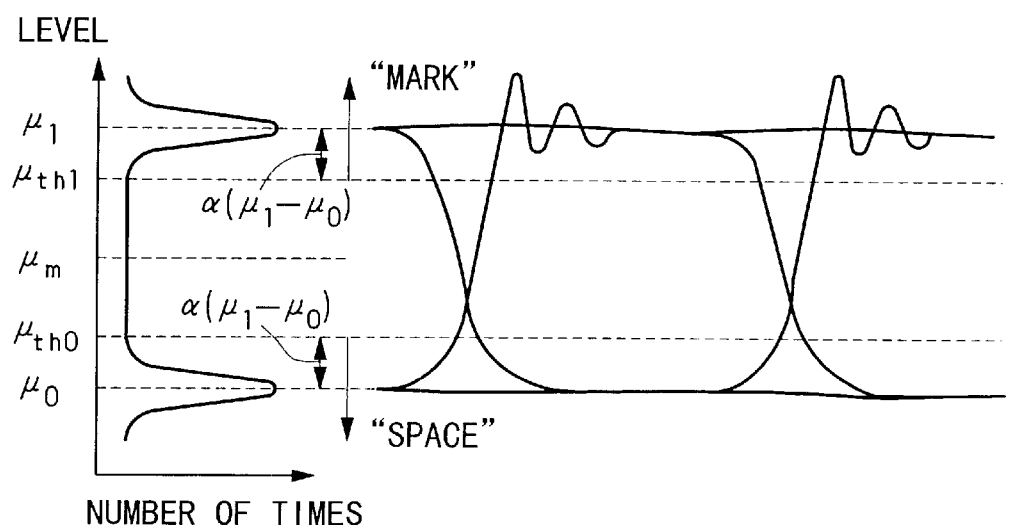
FIG. 4 is a diagram for explaining a method of determining threshold levels.

An example of the method of determining the above threshold levels $\mu_{th1}$ and $\mu_{th0}$ by the electrical signal processing means 5 will be explained with reference to FIG. 4. First, an amplitude histogram is determined based on sampling points which are previously measured within a predetermined period. The number of times (see the horizontal axis) of each sampling point of the histogram is integrated from the side of the maximum level. When the integration result becomes equal to $N_{middle}$ at a certain level, this level is set as the middle value $\mu_m$. Here, the number of times $N_{middle}$ is defined as follows:

$$N_{middle}=N_{total} \times D \times M \qquad (4)$$

where D means the duty ratio (or duty factor: a ratio of the pulse width to the time slot) of the optical signal, and M means the mark ratio (i.e., the probability of appearance of "Mark (i.e., 1)" in digital transmission).

In addition, the average $\mu_1$ of the "MARK" is estimated as follows:

$$\mu_1=2(\mu_m-\mu_0)+\mu_0 \qquad (5)$$

In actual optical transmission systems, the head point may not clearly appear at the "MARK" side of the histogram. Even in such a case, average $\mu_1$ of the "MARK" can be determined according to the above method.

Next, each number of times is examined from the side of the minimum level in the histogram, and when the number of times of sampling points has a peak value at the first time, the relevant level is determined as the average $\mu_0$ of the "SPACE". In addition, threshold levels $\mu_{th0}$ and $\mu_{th1}$ of the "SPACE" and "MARK" are determined as follows:

$$\mu_{th0}=\mu_0+\alpha(\mu_1-\mu_0)$$

$$\mu_{th1}=\mu_1-\alpha(\mu_1-\mu_0) \qquad (6)$$

where $0<\alpha<0.5$.

By substituting equation (5) into equation (6), the following equations are obtained:

$$\mu_{th0}=2\alpha\mu_m+(1-2\alpha)\mu_0$$

$$\mu_{th1}=2(1-\alpha)\mu_m-(1-2\alpha)\mu_0 \qquad (7)$$

The average $\mu_1$ of the "MARK" and standard deviations $\sigma_1$ and $\sigma_0$ of the "MARK" and "SPACE" are determined based on the threshold levels $\mu_{th1}$ and $\mu_{th0}$ as determined above and the amplitude histogram obtained according to all measured values. An "average" coefficient (i.e., "averaged" Q-factor) with respect to the S/N is then determined according to the above-determined values.

This coefficient Q is a physical amount, which corresponds to the S/N of the optical signal. Therefore, the quality of a transmitted signal can be examined by calculating the coefficient Q.

Figure 5:
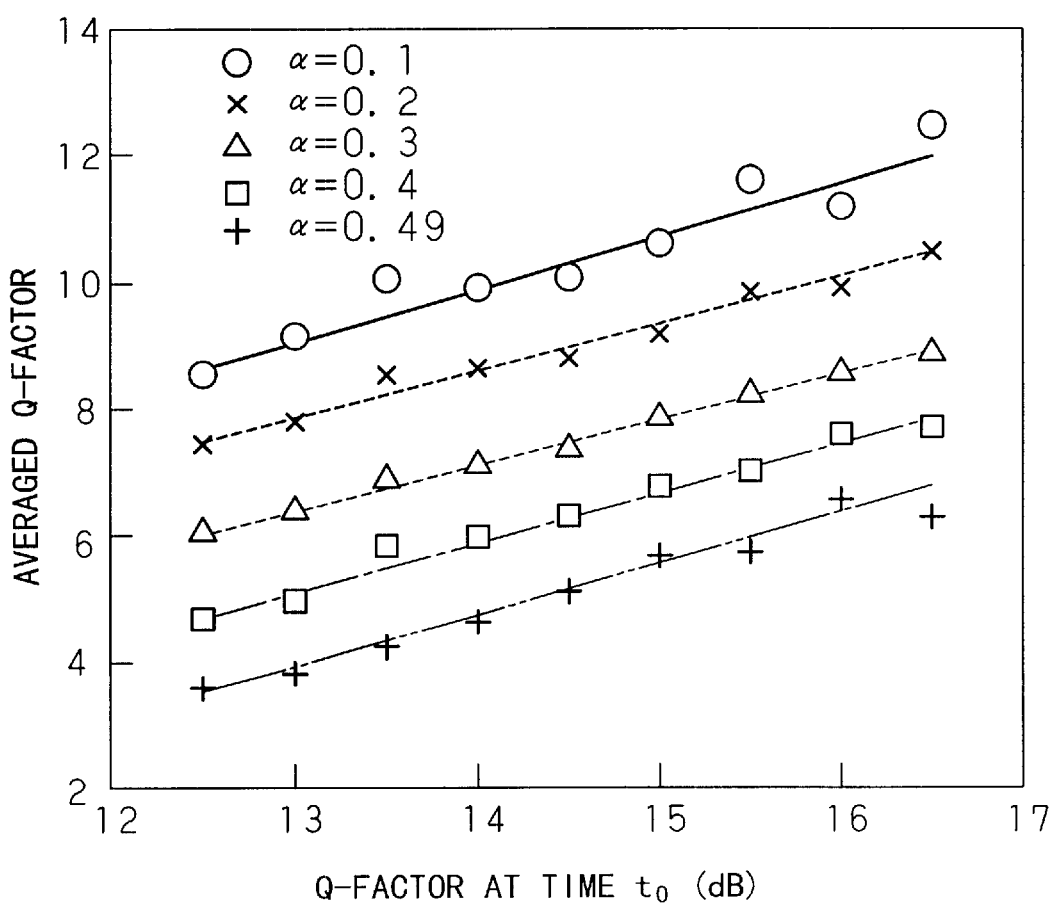
FIG. 5 is a diagram showing a relationship between the averaged Q-factor and the Q-factor at time $t_0$.

FIG. 5 shows the relationship between the averaged Q-factor obtained as explained above, and the Q-factor at time $t_0$. Referring to the figure, with $\alpha$ of 0.1, the number of times with respect to the sampling is decreased; thus, dispersion of the average coefficient Q is increased. In addition, with $\alpha$ of 0.4 or more, measured values near the cross point of the eye diagram are included; thus, the average coefficient Q is decreased and measurement accuracy is degraded. On the other hand, under the conditions $0.1<\alpha<0.4$, a sufficient number of times with respect to the sampling can be obtained and the effect of the cross point can be avoided. Therefore, a desired correlational relationship is realized between the averaged Q-factor and the Q-factor at time $t_0$. Regarding this example as shown in FIG. 5, a high correlation coefficient of 0.99 was obtained.

Accordingly, regarding equation (7), by determining threshold levels $\mu_{th0}$ and $\mu_{th1}$ under the conditions $0.1<\alpha<0.4$, the quality of an optical signal transmitted through a transmission path can be accurately monitored.

Figure 6:
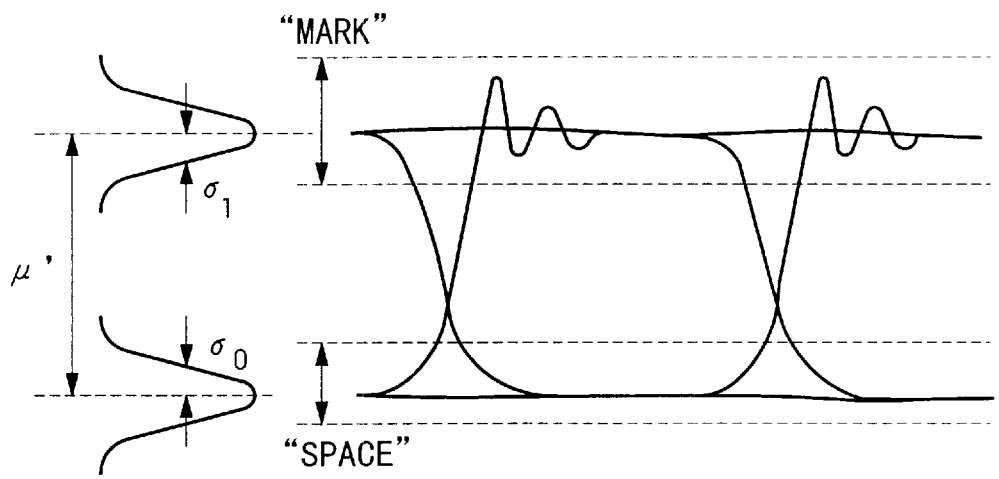
FIG. 6 is a diagram for explaining a method of setting levels with respect to the amplitude histogram measured by the electrical signal processing means.

Another method of determining the "SPACE" and "MARK" will be shown in FIG. 6. That is, two level sections are previously determined, and among sampling points which constitute the histogram, a set of points which belong to a higher-level section is determined as the "MARK", while a set of points which belong to a lower-level section is determined as the "SPACE". A coefficient corresponding to the S/N in this case is defined as:

$$Q=\mu'/(\sigma_1+\sigma_0) \qquad (8)$$

where $\mu'$ is the difference between the average of levels of the "MARK" within a predetermined period and the average of levels of the "SPACE" within a predetermined period, and $\sigma_1$ and $\sigma_0$ are standard deviations of both "MARK" and "SPACE" in each predetermined period.

Figure 7:
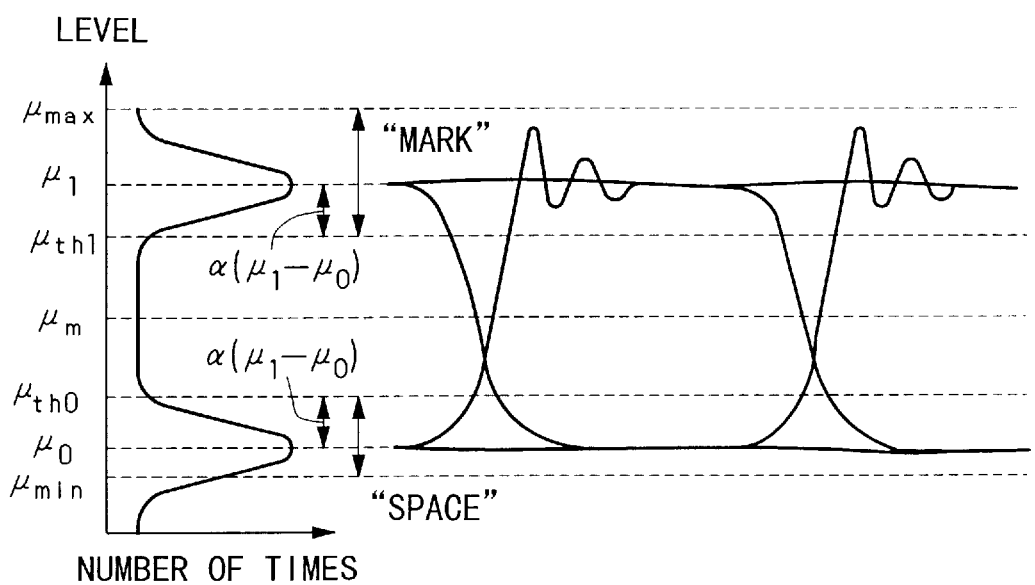
FIG. 7 is a diagram for explaining a method of determining threshold levels.

In this case, for example, with the maximum value $\mu_{max}$ and the minimum value $\mu_{min}$ among levels of sampling points previously measured in a predetermined time, the section of the "MAR" is set to be "$\mu_{th1}$ or more and $\mu_{max}$ or less", while the section of the "SPACE" is set to be "$\mu_{min}$ or more and $\mu_{th0}$ or less", as shown in FIG. 7.

As shown in the basic arrangement explained above, the present invention differs from the conventional error-rate measuring method in which data capture and error judgment are performed at a frequency corresponding to the bit rate of the target optical signal, and at the point where a most desirable eye-diagram opening is obtained. In the monitoring system of the present invention, sampling of the optical signal is performed so as to determine a histogram of the optical signal, and the temporally averaged coefficient (i.e., Q-factor) with respect to the S/N is monitored based on the histogram. The present system can monitor the quality of any optical signal having a bit rate $Nf_0$ (bit/s), that is, N (natural number: 1, 2, ...) times as much as the basic clock frequency $f_0$ (Hz). In addition, sampling optical pulses having a narrow pulse width, and optical sampling using nonlinear optical effect having a quick response are effectively used; thus, even optical signals of a few dozen Gbit/s or more can be monitored for quality. Monitoring of optical signals with such high bit rates cannot be realized using the conventional technique.

FIRST EMBODIMENT

FIG. 8 shows the first embodiment of the system for monitoring the quality of an optical signal, according to the present invention.

In the figure, an optical signal having bit rate $N \cdot f_0$ (bit/s) which is N (natural number: 1, 2, . . . ) times as much as basic clock frequency $f_0$ (Hz) is input from a transmission path. A portion of this optical signal is separated by optical coupler 51-1. Preferably, the branch ratio of the monitor port (connected with the monitoring side) of the coupler to the other port connected with the transmission path is set as small as possible so as to prevent the transmission characteristics from degrading due to the power loss caused by the branch operation. The optical signal output from the monitor port of the optical coupler 51-1 is further separated into two portions by optical coupler 51-2.

One portion of the optical signal separated by optical coupler 51-2 is input into timing-clock generator 11. In the generator, basic clock frequency $f_0$ (Hz) is extracted from the input signal, and a timing-clock signal of $f_0/n_1-\Delta f$ (Hz) or $f_0/n_1+\Delta f$ (Hz) ($n_1$=1, 2, . . . ) is generated by subtracting offset frequency $\Delta f$ (Hz) from or adding the offset frequency to "$f_0/n_1$". Short-optical-pulse generator 12 uses the above timing clock and generates a sampling optical pulse train of pulse repetition frequency $f_0/n_1-\Delta f$ (Hz) or $f_0/n_1+\Delta f$ (Hz), the pulse width being sufficiently narrower than the time slot of the relevant optical signal.

The other portion of the optical signal divided by optical coupler 51-2 and the sampling optical pulse train output from the short-optical-pulse generator 12 are multiplexed by optical multiplexer 2, and the multiplexed signal is input into nonlinear optical material 3. The nonlinear optical material 3 generates a cross-correlation optical signal (SFG, DFG, or FWM) between the optical signal and the sampling optical pulses. This cross-correlation optical signal is converted into a cross-correlation electrical signal by photoelectric converter 4. The electrical signal is then input into electrical signal processing unit 5. The electrical signal processing unit 5 performs detection of peak values of the above cross-correlation electrical signal and analysis of the signal so as to measure and determine the histogram as shown in FIG. 3. Also in the electrical signal processing unit 5, the coefficient Q is determined based on the above-explained principle, and the quality of the target optical signal is examined. According to these operations, regarding an optical fiber transmission network in which digital optical signals of different bit rates are transmitted, the quality of each optical signal can be examined using a single measurement and monitoring system, irrespective of bit rates.

Here, correspondence between the present embodiment and the basic arrangement is shown in FIG. 1. The timing-clock generator 11 and short-optical-pulse generator 12 correspond to the sampling optical pulse generating means 1. Other elements having identical reference numbers directly correspond to each element in FIG. 1. In the present embodiment, so as to extract the basic clock frequency $f_0$ of the optical signal via the timing-clock generator 11, a portion of the optical signal transmitted through the transmission path is separated using optical couplers 51-1 and 51-2.

Figure 9A:
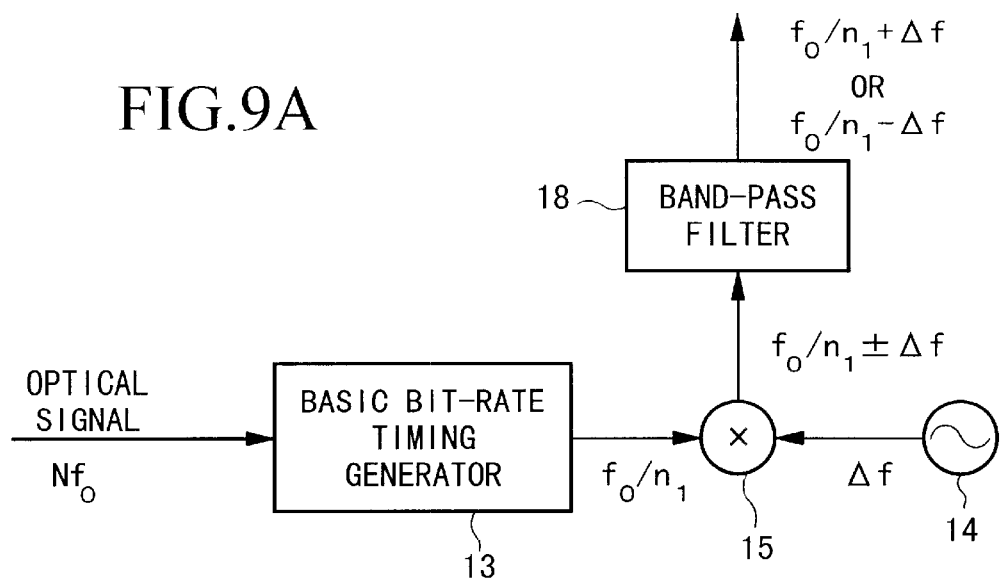
FIGS. 9A–9C are block diagrams showing examples of the structure of the timing-clock generator.
Figure 9B:
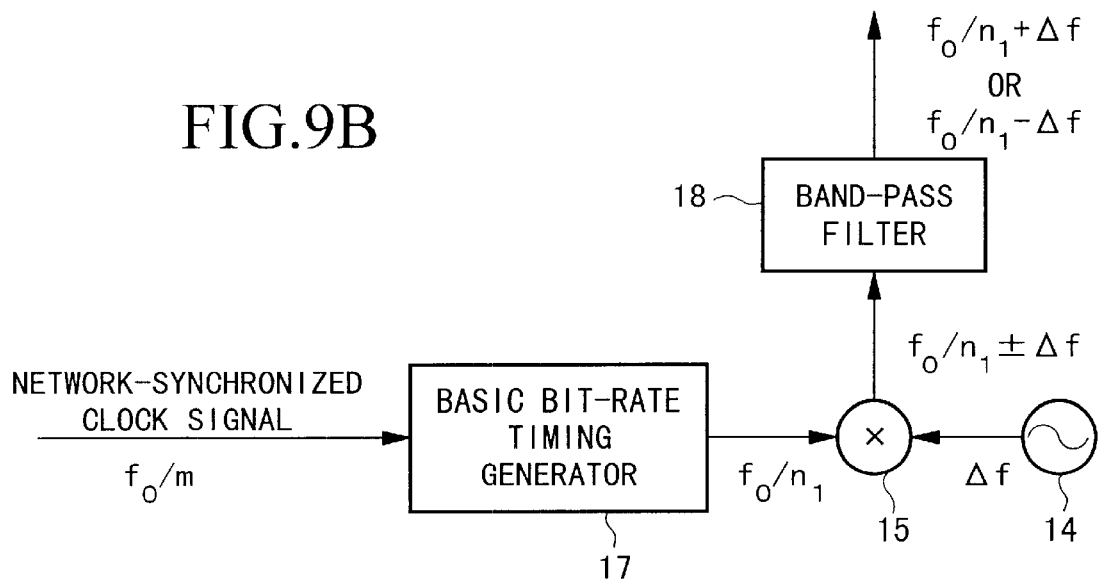
Figure 9C:
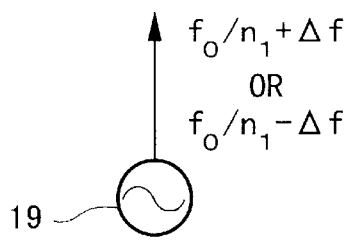

FIGS. 9A–9C show examples of the structure of the timing-clock generator.

In FIG. 9A, basic bit-rate timing generator 13 generates a signal of clock frequency $f_0/n_1$ ($n_1$=1, 2 . . . ) using an optical signal of bit rate $N \cdot f_0$, where $f_0$ is the basic clock frequency. Oscillator 14 generates a signal of offset frequency $\Delta f$. Mixer 15 mixes the clock frequency $f_0/n_1$ and the offset frequency $\Delta f$, and generates a timing clock signal of frequency $f_0/n_1 \pm \Delta f$ (Hz). Band-pass filter 18 outputs only one of two frequency components of $f_0/n_1-\Delta f$ (Hz) and $f_0/n_1+\Delta f$ (Hz).

A method of determining the offset frequency $\Delta f$ will be explained below.

Figure 10:
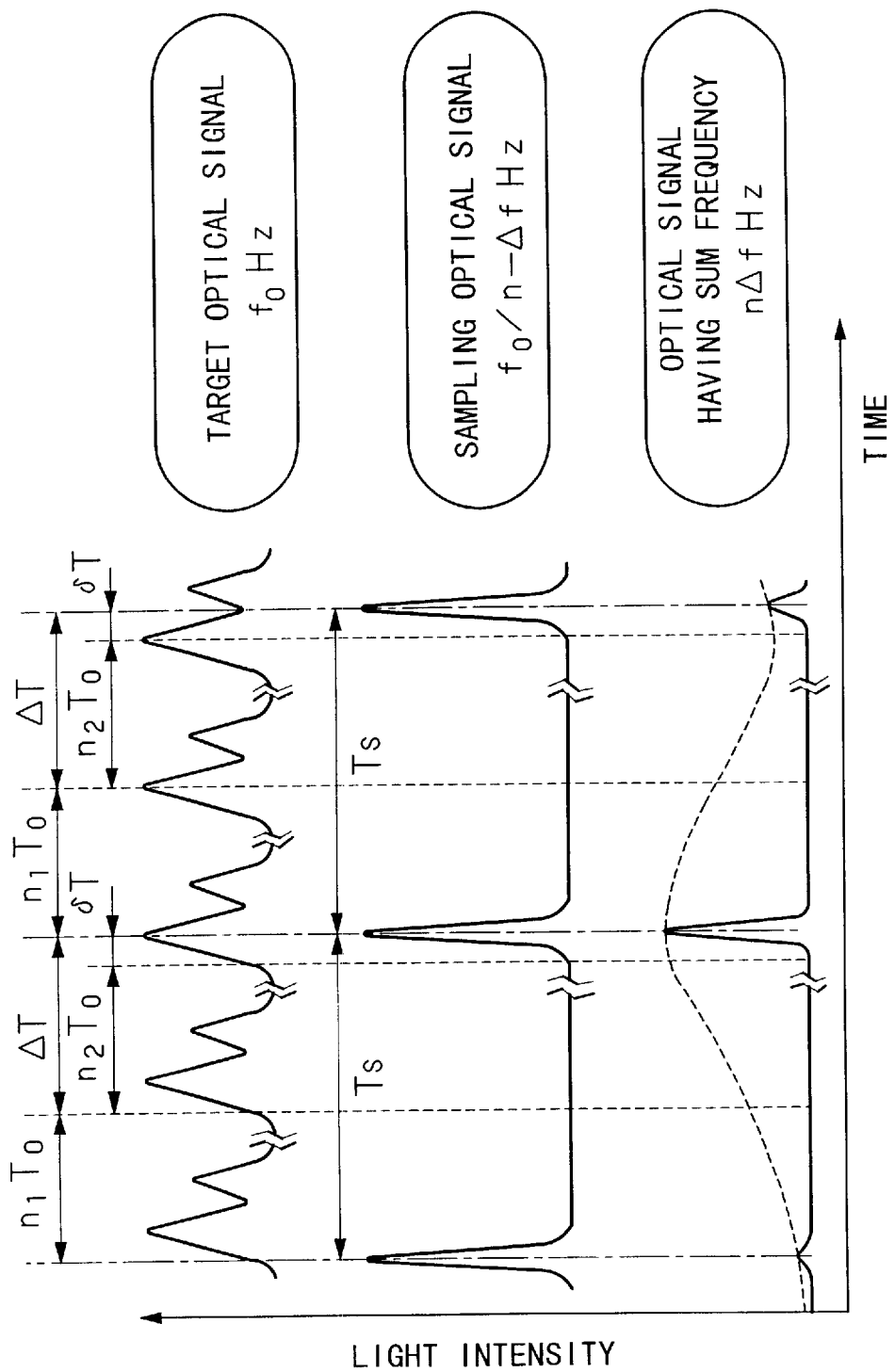
FIG. 10 is a timing chart showing a relationship, with respect to a time axis, between the optical signal, the sampling optical signal, and the generated optical signal having the sum frequency.

FIG. 10 is a timing chart showing the relationship, with respect to the time axis, between the optical signal, the sampling optical signal (here, pulse train), and the generated optical signal having the sum frequency. The pulse repetition frequency of the sampling optical pulses is smaller than $f_0/n_1$ (here, $f_0$ being the pulse repetition frequency of the optical signal) by $\Delta f$; thus, as shown in FIG. 10, in the sweep of the sampling optical pulses, the relative position of each pulse with respect to the optical signal is shifted for each cycle by $\Delta T$. This relative positional shift $\Delta T$ corresponds to a difference between pulse repetition period Ts (=1/fs) of the sampling optical pulses and period $n_1 T_0$ (corresponding to frequency $f_0/n_1$, where $T_0=1/f_0$), that is:

$$\Delta T = Ts - n_1 T_0 = 1/(f_0/n_1-\Delta f) - n_1/f_0 \approx n_1^2 \Delta f/f_0^2 \tag{9}$$

The above relative positional shift $\Delta T$ is represented as a sum of $n_2 \times T_0$ and $\delta T$ (the step time of sampling), as follows:

$$\Delta T = n_2 T_0 + \delta T \tag{10}$$

This equation means sampling of the waveform of the optical signal by using sampling step time $\delta T$. Here, according to equations (9) and (10), $\Delta f$ is represented as follows:

$$\Delta f = f_0(n_1+f_0 \delta T)/(n_1(n_1+n_2+f_0 \delta T)) \tag{11}$$

where $n_1$ and $n_2$ are natural numbers.

Accordingly, offset frequency $\Delta f$ is calculated using equation (11), thereby sampling the optical signal using a desired sampling step time $\delta T$. In addition, a combination of natural numbers $n_1$ and $n_2$ can be suitably selected; thus, the offset frequency and the timing clock can be suitably determined in consideration of the frequency range of the present sampling light source and signal-processing system.

The temporal resolution for the sampling according to the present invention mainly depends on the pulse width $\Delta \tau$ of the sampling optical pulses generated by short-optical-pulse generator 12 and on the response speed of the nonlinear optical material 3.

A mode-locked fiber laser, a mode-locked semiconductor laser, a gain-switching semiconductor laser, or the like, may be used as the short-optical-pulse generator 12. Recently, it has become possible to generate short optical pulses having a pulse width of 1 ps or less, using such a laser source. As nonlinear optical material 3, for SFG and DFG, a second-order nonlinear optical material can be used, for example, an inorganic material such as KTP (molecular formula: $KTiOPO_4$) and $LiNbO_3$, an organic material such as AANP, and a semiconductor waveguide. For FWM, a third-order nonlinear optical material can be used, for example, a quartz optical waveguide such as an optical fiber. The response speed of the above materials is 0.1 ps or less. Therefore, by using one of the above materials, temporal resolution of 1 ps or less can be realized. This temporal resolution corresponds to a bit rate of a few hundred Gbit/s.

As optical multiplexer 2, an ordinary optical coupler may be used. However, if a wavelength-division multiplexed optical coupler is used, the sampling optical pulses and the optical signal can be multiplexed with lower power loss. In addition, if the polarization directions of the sampling optical pulses and the optical signal are orthogonal, a polarization beam splitter may be used for performing polarization multiplexing.

In addition, if SFG or DFG is used as the nonlinear optical effect, the nonlinear optical material to be used is limited depending on the polarization directions of the optical signal and sampling optical pulses. If both polarization directions are in parallel, then a second-order nonlinear optical material for performing "type I phase matching" should be used, in which the cross-correlation optical signal is efficiently generated when the polarization directions of two basic optical signals are parallel. On the other hand, if both polarization directions are orthogonal, then a second-order nonlinear optical material for performing "type II phase matching" should be used, in which the cross-correlation optical signal is efficiently generated when the polarization directions of two basic optical signals are orthogonal (refer to the above Reference 2). If FWM is used as the nonlinear optical effect, the polarization directions of the optical signal and the sampling optical pulses should be in parallel in order to efficiently generate the cross-correlation optical signal.

If the conversion efficiency of the nonlinear optical material 3 to be used is insufficient, then the peak powers of the optical signal and the sampling optical pulses are amplified using an optical amplifier which can be inserted before or after the optical multiplexer 2. An optical amplifier using a rare-earth doped fiber, or a semiconductor optical amplifier may be used as the above optical amplifier.

In the optical signal output from the nonlinear optical material 3, besides the cross-correlation optical signal having a sum or difference frequency or a four-wave mixed frequency, the optical signal and the sampling optical pulses are also included. In addition, under some conditions, second-order harmonic light of the optical signal and the sampling optical pulse train may be generated. If such other components degrade the S/N of the cross-correlation optical signal to be measured, wavelength filter 32 is inserted between the nonlinear optical material 3 and photoelectric converter 4 so as to extract only the cross-correlation optical signal.

SECOND EMBODIMENT

Figure 11:
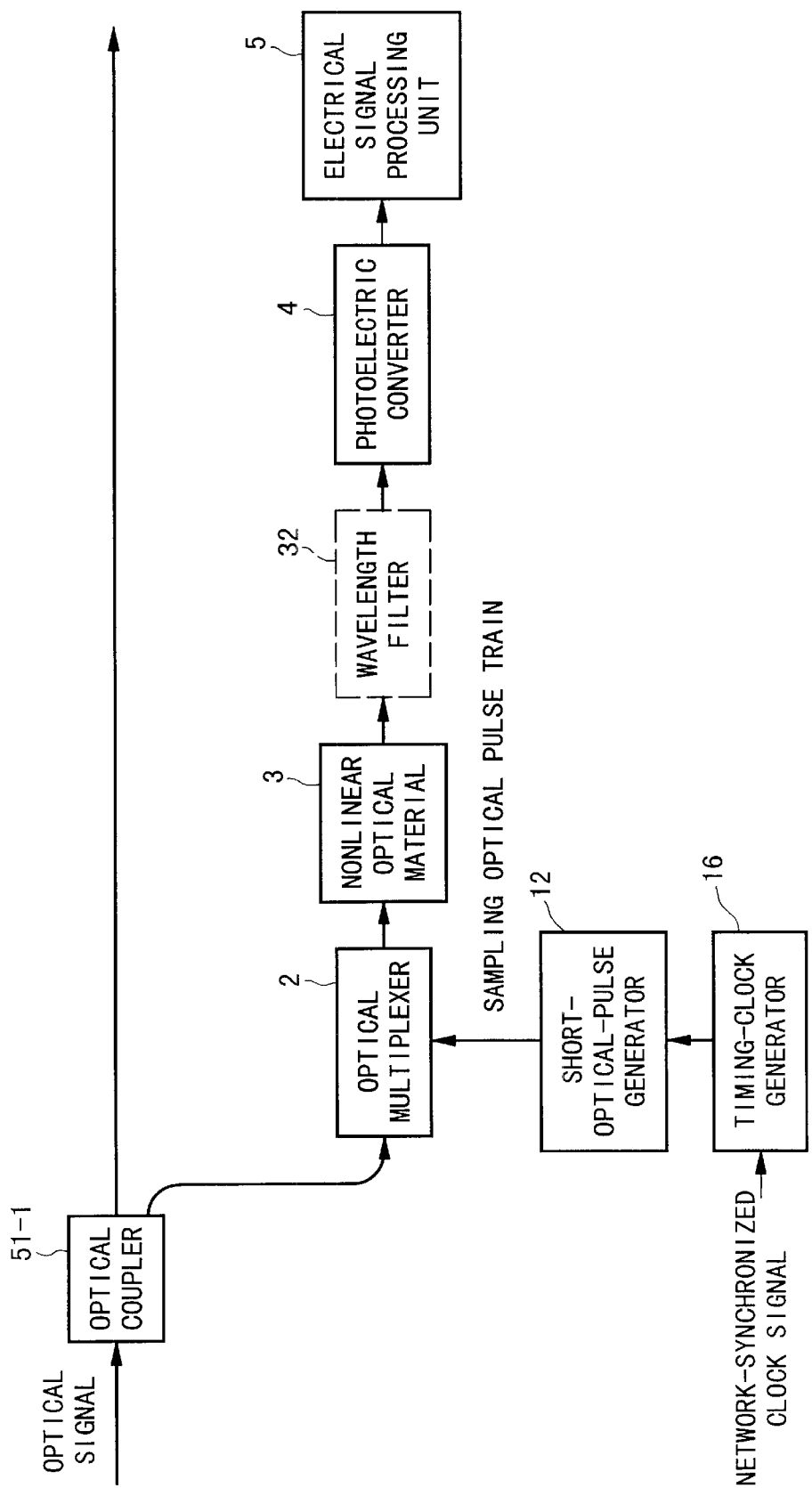
FIG. 11 is a block diagram showing the second embodiment of the optical signal quality monitoring system according to the present invention.

FIG. 11 shows the second embodiment of the system for monitoring the quality of an optical signal, according to the present invention.

The feature of the present embodiment is to use timing-clock generator 16 in place of timing-clock generator 11. The timing-clock generator 16 uses a network-synchronized clock signal having clock frequency $f_0/m$ ($f_0$ is the basic clock frequency, and m=1, 2, . . . ), and generates a timing-clock signal of $f_0/n_1-\Delta f$ (Hz) or $f_0/n_1+\Delta f$ (Hz) ($n_1$=1, 2, . . . ). Here, the offset frequency $\Delta f$ can be determined based on the above equation (11). The other structural elements are the same as those of the first embodiment.

The internal structure of the timing-clock generator 16 may comprise, as shown in FIG. 9B, basic bit-rate timing generator 17 for generating the clock frequency $f_0/n_1$ using a network-synchronized clock signal having bit rate $f_0/m$.

Instead of the timing-clock generator 11 (see FIG. 9A) as explained in the first embodiment and the timing-clock generator 16 (see FIG. 9B) as explained in the second embodiment, an oscillator 19 for oscillating a timing-clock signal of $f_0/n_1-\Delta f$ or $f_0/n_1+\Delta f$, obtained by subtracting offset frequency $\Delta f$ from or adding $\Delta f$ to $f_0/n_1$, may be used as a timing-clock generator, as shown in FIG. 9C.

THIRD EMBODIMENT

Figure 12:
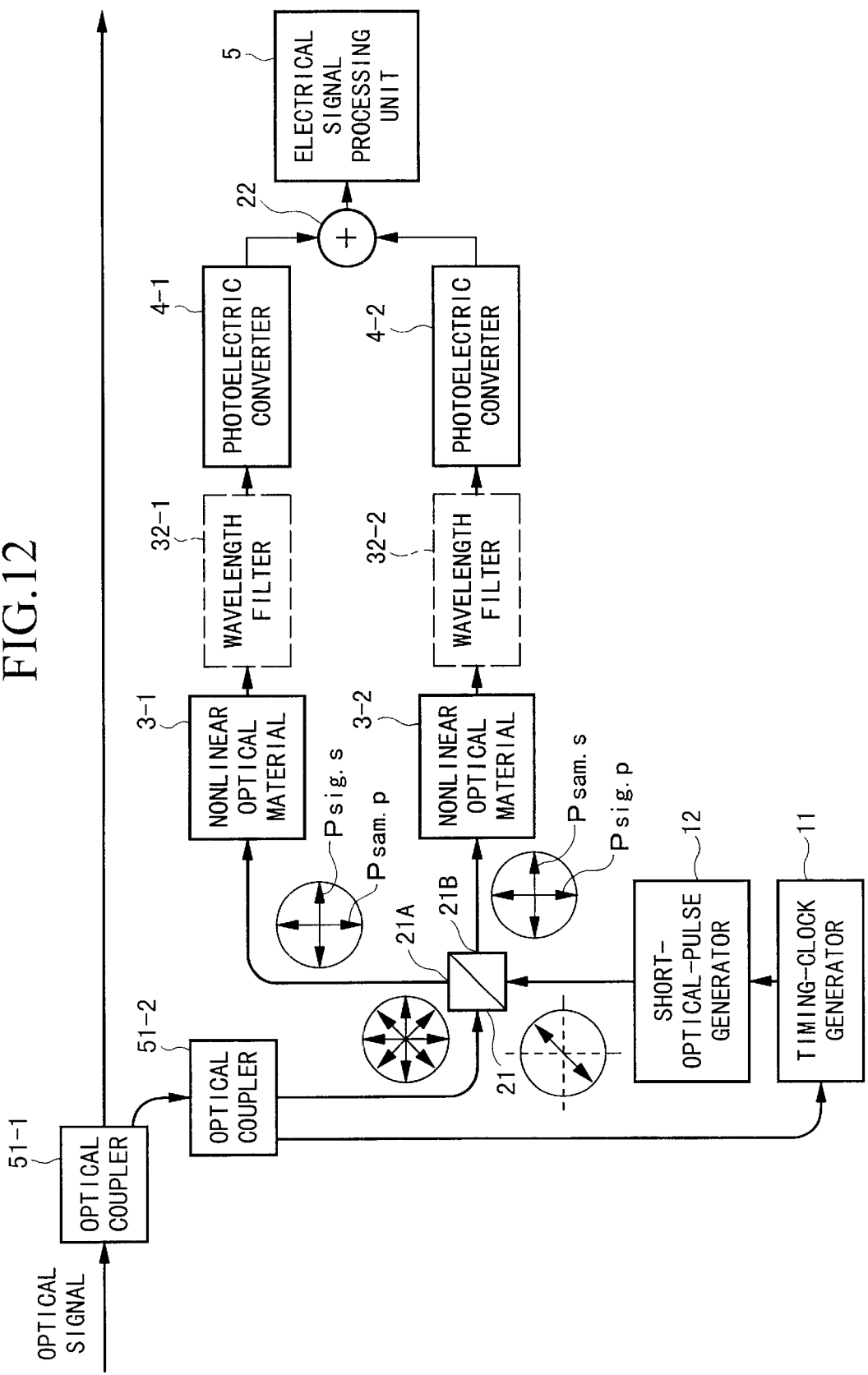
FIG. 12 is a block diagram showing the third embodiment of the optical signal quality monitoring system according to the present invention.

FIG. 12 shows the third embodiment of the system for monitoring the quality of an optical signal, according to the present invention.

The nonlinear optical effect used in the present invention generally depends on polarization, and the power of the generated cross-correlation optical signal is changed in accordance with the polarization states of the input signals. The polarization dependency can be excluded in the present embodiment.

Therefore, polarization beam splitter 21 having two input ports and two output ports is used in place of optical coupler 2 in the first embodiment. In this case, the optical signal and the sampling optical pulse train are respectively input into these input ports, and a series of nonlinear optical material 3-1, wavelength filter 32-1, and photoelectric converter 4-1 is connected to the first output port, while a series of nonlinear optical material 3-2, wavelength filter 32-2, and photoelectric converter 4-2 is connected to the second output port. The cross-correlation optical signals output from each photoelectric converter are added to each other by adding circuit 22. The added signal is input into electrical signal processing unit 5.

In the present arrangement, the sampling optical pulse train input into the polarization beam splitter 21 is linearly polarized, where the polarization axis thereof is inclined by 45° with respect to the principal polarization axis of the polarization beam splitter 21. Accordingly, the optical signal input into polarization beam splitter 21 is split into two orthogonal polarization components Psig. p and Psig. s. Similarly, the sampling optical pulse train input into polarization beam splitter 21 is split into two orthogonal polarization components Psam. p and Psam. s. The orthogonal components belonging to the optical signal and the sampling optical pulse train are polarization-multiplexed with each other, that is, a multiplexed signal of a set of components Psig. s and Psam. p is output from output port 21A, while a multiplexed signal of a set of components Psig. p and Psam. s is output from output port 21B. The optical signal and the sampling optical pulse train which were output from each output port are converted into a cross-correlation optical signal via each of nonlinear optical materials 3-1 and 3-2. The obtained cross-correlation optical signals are respectively converted into electrical signals by photoelectric converters 4-1 and 4-2. The dual cross-correlation optical signals are added to each other by adding circuit 22, and the added signal is input into electrical signal processing unit 5. The coefficient Q is then calculated after measuring and calculating operations similar to those in the first embodiment, so that the quality of the optical signal is examined.

In the present embodiment, the sampling optical pulse train is linearly polarized, where the polarization axis thereof is inclined by 45° with respect to the polarization principal axis of the polarization beam splitter 21, thereby equalizing two components Psam. p and Psam. s in the lines from the polarization beam splitter 21. That is, with the total power Psam of the sampling optical pulse train, and on the assumption that "Psam. p" and "Psam. s" respectively represent the power of the corresponding components, the following relationship is realized:

$$\text{Psam. p} = \text{Psam. s} = 0.5 \text{ Psam} \tag{12}$$

On the other hand, at the time of inputting the optical signal into the polarization beam splitter 21, no limitation is imposed on the polarization state of the optical signal. Therefore, the optical signal is split into two polarization components Psig. p and Psig. s of any power ratio by the polarization beam splitter 21. Here, the sum of these components is constant; thus, with the total power Psig of the optical signal, the following relationship is realized:

$$\text{Psig. p} + \text{Psig. s} = \text{Psig} \tag{13}$$

With a conversion efficiency $\eta$ of the nonlinear optical material, the total power Pint of the cross-correlation optical signals generated by the nonlinear optical materials 3-1 and 3-2 is represented as follows:

$$\text{Pint} = \eta \text{ Psig. p Psam. s} + \eta \text{ Psig. s Psam. p} \quad (14)$$

By substituting equations (12) and (13) into equation (14), the following equation is obtained:

$$\text{Pint} = 0.5\eta \text{ Psig Psam} \quad (15)$$

This equation (15) means that the sum of the dual cross-correlation optical signals does not depend on the polarization state of the input optical signal.

However, equation (15) may be ineffective due to inaccuracy of the splitting ratio of the polarization beam splitter 21 or a specific difference of the conversion efficiencies of the two nonlinear optical materials; thus, a slight level of polarization dependency may occur. In such a case, suitable weighting with respect to the levels of the dual cross-correlation optical signals is executed in the adding circuit 22 so that the level of the added cross-correlation optical signal does not depend on the polarization state of the optical signal.

By monitoring the coefficients of the S/N using the above arrangement, the quality of the optical signal can be examined independantly of the bit rate and the polarization state of the optical signal.

In the present embodiment, as in the second embodiment, timing-clock generator 16 may be used in place of timing-clock generator 11. The timing-clock generator 16 uses a network-synchronized clock signal having clock frequency $f_0/m$, and generates a timing-clock signal of $f_0/n_1 - \Delta f$ (Hz) or $f_0/n_1 + \Delta f$ (Hz) ($n_1 = 1, 2, \ldots$). In addition, a timing-clock generator consisting only of an oscillator may be used, as described above.

FOURTH EMBODIMENT

Figure 13:
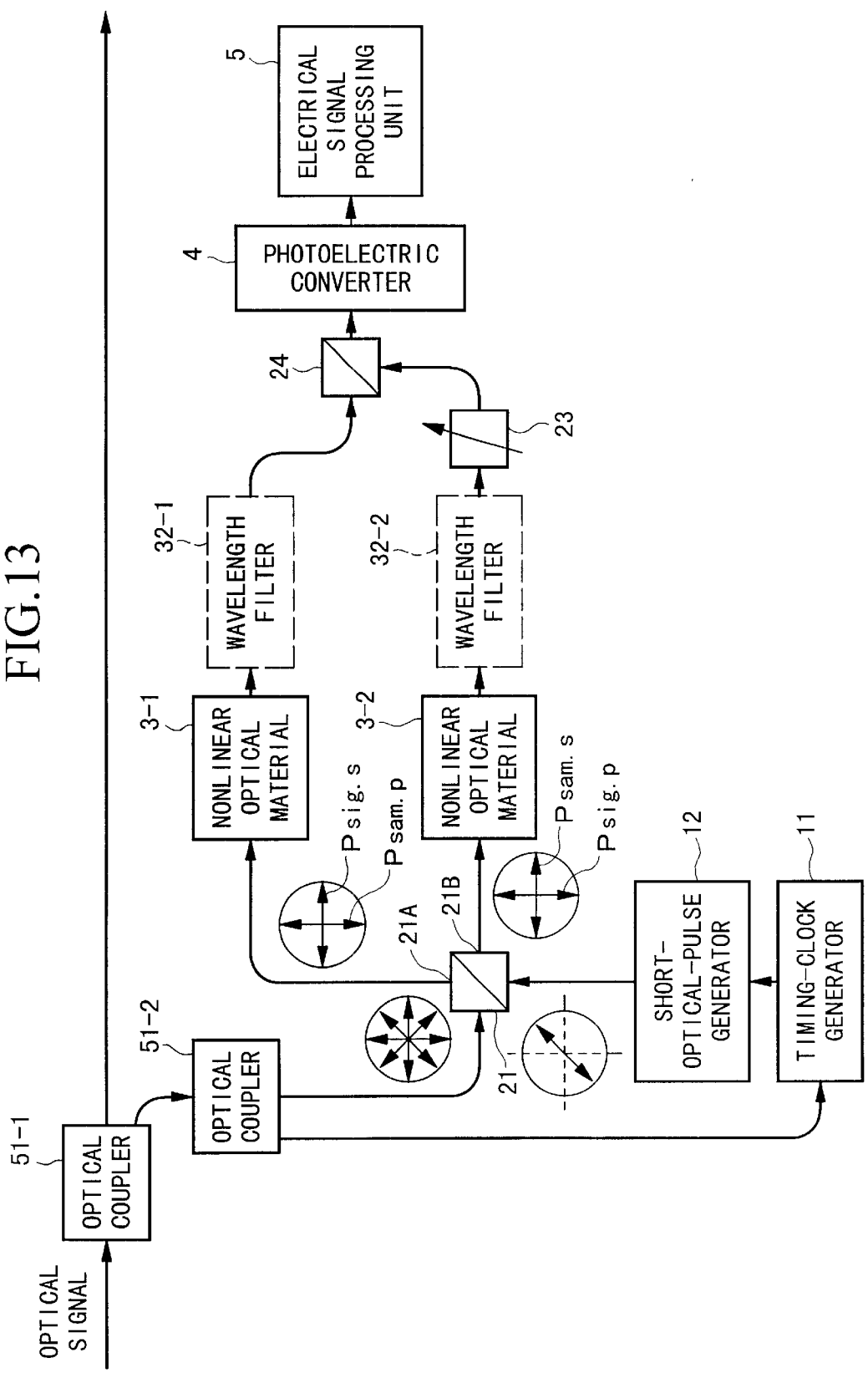
FIG. 13 is a block diagram showing the fourth embodiment of the optical signal quality monitoring system according to the present invention.

FIG. 13 shows the fourth embodiment of the system for monitoring the quality of an optical signal, according to the present invention.

The feature of the present embodiment is that instead of adding circuit 22 in the third embodiment, the timing conditions of the dual cross-correlation optical signals are matched with each other by making one signal pass through optical delay unit 23. The signals after the timing matching are polarization-multiplexed by the polarization beam splitter 24, and the multiplexed signal is input into the photoelectric converter 4. The other structural elements are similar to those of the third embodiment.

FIFTH EMBODIMENT

Figure 14:
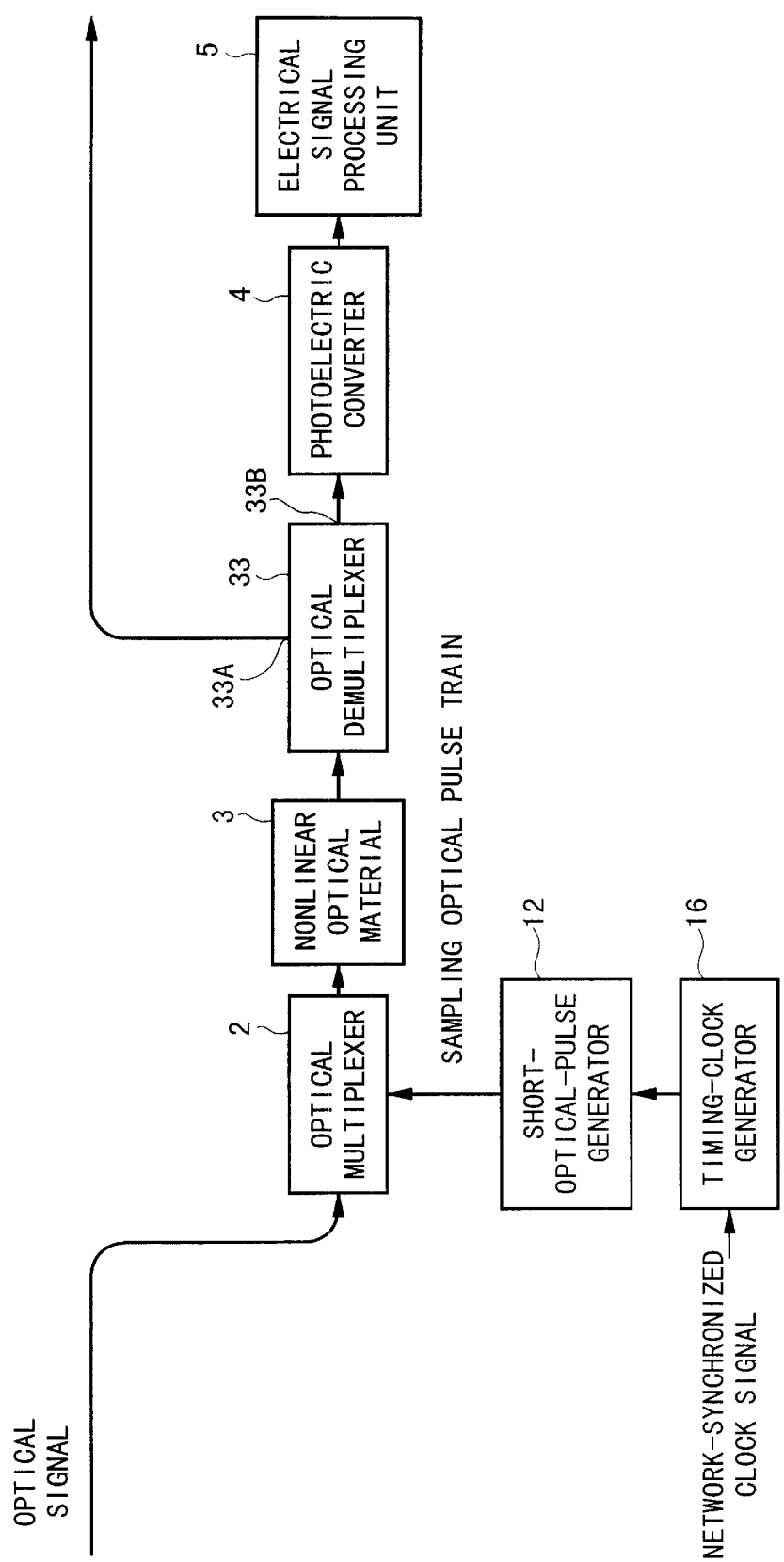
FIG. 14 is a block diagram showing the fifth embodiment of the optical signal quality monitoring system according to the present invention.

FIG. 14 shows the fifth embodiment of the system for monitoring the quality of an optical signal, according to the present invention.

In the above first to fourth embodiments, it is necessary to separate a portion of the optical signal transmitted in the transmission path by using optical coupler 51-1, so as to examine the quality of the optical signal. In this arrangement, a loss in the power of the optical signal transmitted in the transmission path is inevitable. If the branch ratio of a portion input into the monitoring system to the remaining portion is lowered so as to minimize such a power loss of the optical signal, the S/N of the monitoring signal is degraded even if the signal is amplified using an optical amplifier; thus, a cross-correlation optical signal having sufficient power cannot be obtained.

The feature of the present embodiment is to input a sampling optical pulse train into the transmission path and generate a cross-correlation optical signal. The optical signal and the cross-correlation optical signal are wavelength-division demultiplexed, thereby reducing the power loss of the optical signal transmitted through the transmission path.

That is, using timing-clock generator 16 and short-optical-pulse generator 12, a sampling optical pulse train of pulse repetition frequency $f_0/n_1 - \Delta f$ (Hz) or $f_0/n_1 + \Delta f$ (Hz) is generated using the network-synchronized clock signal having clock frequency $f_0/m$. Optical multiplexer 2, nonlinear optical material 3, and optical demultiplexer 33 are inserted in the transmission path. The optical signal transmitted from the "upper" stream in the transmission path and the sampling optical pulse train are then multiplexed by optical multiplexer 2 and the multiplexed signal is input into the nonlinear optical material 3 so that a cross-correlation optical signal is generated.

The output from the nonlinear optical material 3 includes the optical signal (optical frequency: $\omega_{sig}$), the sampling optical pulse train (optical frequency: $\omega_{sam}$), and the cross-correlation optical signal having a sum frequency (optical frequency $\omega_{sfg} = \omega_{sam} + \omega_{sig}$), a difference frequency (optical frequency $\omega_{dfg} = \omega_{sam} - \omega_{sig}$), or a four-wave mixed frequency (optical frequency $\omega_{fwm} = 2\omega_{sam} - \omega_{sig}$). Under some conditions, a second order harmonic of the optical signal (optical frequency: $2\omega_{sig}$) and a second-order harmonic of the sampling optical pulse train (optical frequency: $2\omega_{sam}$) may be generated. The optical demultiplexer 33 extracts the optical signal and the cross-correlation optical signal, and outputs them from different ports 33A and 33B. The separated optical signal (optical frequency: $\omega_{sig}$) is transmitted to the "lower" stream of the transmission path, while the cross-correlation optical signal (optical frequency: $\omega_{sfg}$, $\omega_{dfg}$, or $\omega_{fwm}$) is input into photoelectric converter 4 so as to convert the signal into the cross-correlation electrical signal. The converted electrical signal is processed in the electrical signal processing unit 5 via operations similar to those of the first embodiment. The coefficient Q is thus obtained and the quality of the optical signal is examined.

By monitoring the coefficients of the S/N using the above arrangement, the quality of the optical signal can be examined independently of the bit rate of the optical signal, and without degrading the S/N of the optical signal transmitted through the transmission path.

SIXTH EMBODIMENT

Figure 15:
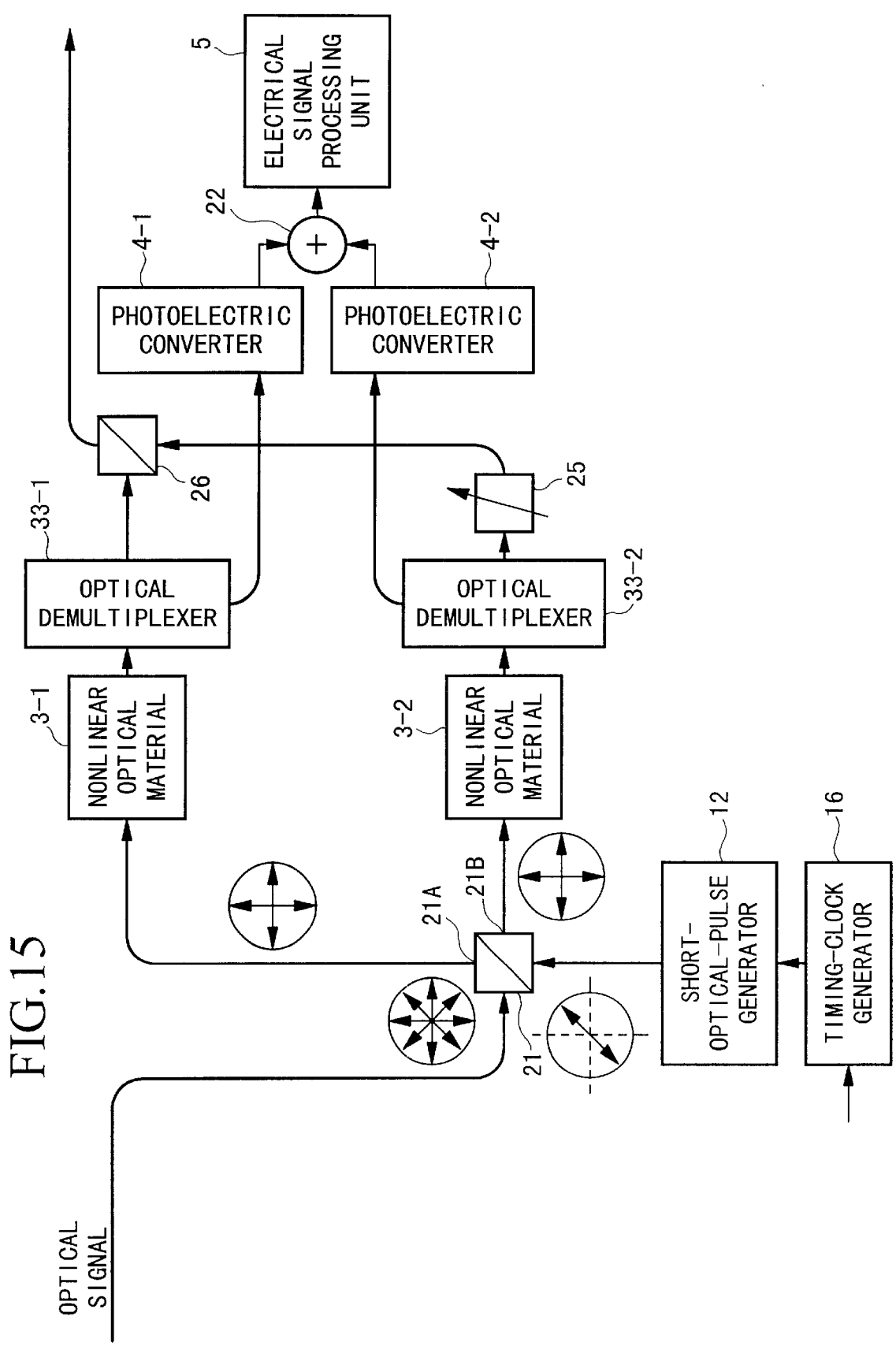
FIG. 15 is a block diagram showing the sixth embodiment of the optical signal quality monitoring system according to the present invention.

FIG. 15 shows the sixth embodiment of the system for monitoring the quality of an optical signal, according to the present invention.

The feature of the present embodiment is to combine the structures of the third and fifth embodiments. That is, this arrangement does not depend on the polarization state of the target optical signal, and reduces the power loss of the optical signal transmitted in the transmission path.

The optical signal transmitted from the upper stream in the transmission path and the sampling optical pulse train are respectively input through different ports into polarization beam splitter 21. At this time, the polarization of the sampling optical pulse train is linearly polarized, where the polarization axis thereof is inclined by 45° with respect to the principal polarization axis of the polarization beam splitter 21. In polarization beam splitter 21, the optical signal input into polarization beam splitter 21 is split into two orthogonal polarization components Psig. p and Psig. s. Similarly, the sampling optical pulse train input into polarization beam splitter 21 is split into two orthogonal polarization components Psam. p and Psam. s. The orthogonal components belonging to the optical signal and the sampling optical pulse train are polarization-multiplexed with each other, that is, a multiplexed signal of a set of components Psig. s and Psam. p is output from output port 21A, while a multiplexed signal of a set of components Psig. p and Psam. s is output from output port 21B.

The optical signal and the sampling optical pulse train which were output from each output port are converted into a cross-correlation optical signal via each of nonlinear optical materials 3-1 and 3-2. The component input into optical demultiplexer 33-1 is divided into a component of the optical signal and another component of the cross-correlation optical signal. Similarly, the component input into optical demultiplexer 33-2 is also divided into a component of the optical signal and another component of the cross-correlation optical signal. The timing situations of the dual optical signals are matched with each other using optical delay unit 25, and the signals are further polarization-multiplexed using polarization beam splitter 26. The multiplexed signal is transmitted into the lower stream of the transmission path. On the other hand, the dual cross-correlation optical signals are respectively converted into cross-correlation electrical signals by photoelectric converters 4-1 and 4-2. The converted cross-correlation electrical signals are then added to each other via adding circuit 22. The added signal is input into electrical signal processing unit 5 and is processed in a similar way to that of the first embodiment so that the coefficient Q is calculated and the quality of the optical signal is examined.

By monitoring the coefficients of the S/N using the above arrangement, the quality of the optical signal can be reliably examined independently of the bit rate of the optical signal, without degrading the S/N of the optical signal transmitted through the transmission path, and not depending on the polarization state of the optical signal.

SEVENTH EMBODIMENT

Figure 16:
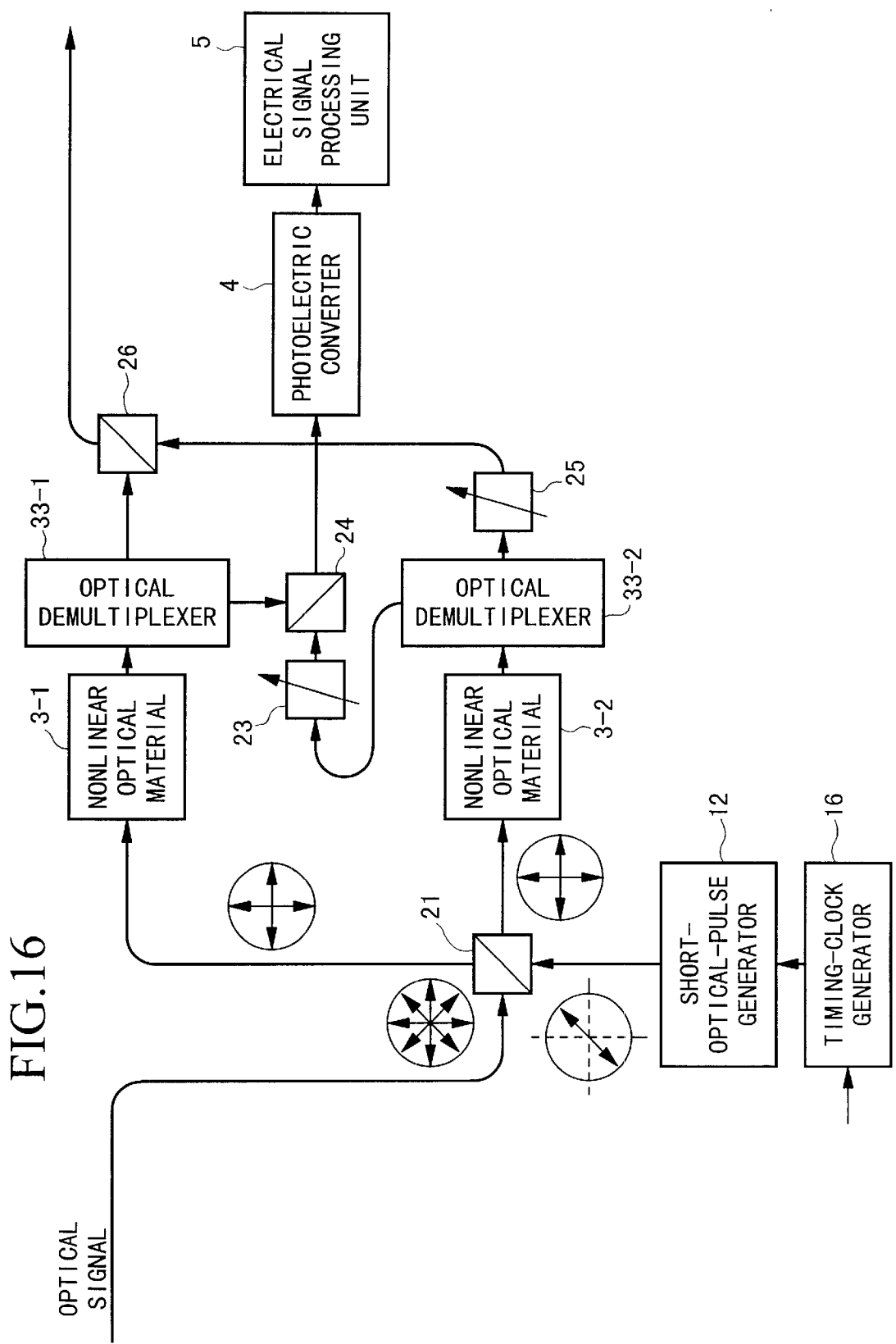
FIG. 16 is a block diagram showing the seventh embodiment of the optical signal quality monitoring system according to the present invention.

FIG. 16 shows the seventh embodiment of the system for monitoring the quality of an optical signal, according to the present invention.

The feature of the present embodiment is to combine the fourth and fifth embodiments. That is, the present arrangement does not depend on the polarization state of the optical signal, and reduces the power loss of the optical signal transmitted on the transmission path.

The present embodiment does not use adding circuit 22 used in the sixth embodiment. The timing situations of the dual cross-correlation optical signals are matched via optical delay unit 23, and the signals are then polarization-multiplexed by polarization beam splitter 24. The multiplexed signal is input into photoelectric converter 4. The other structural elements are the same as those of the sixth embodiment.

EIGHT EMBODIMENT

Figures 17, 18:
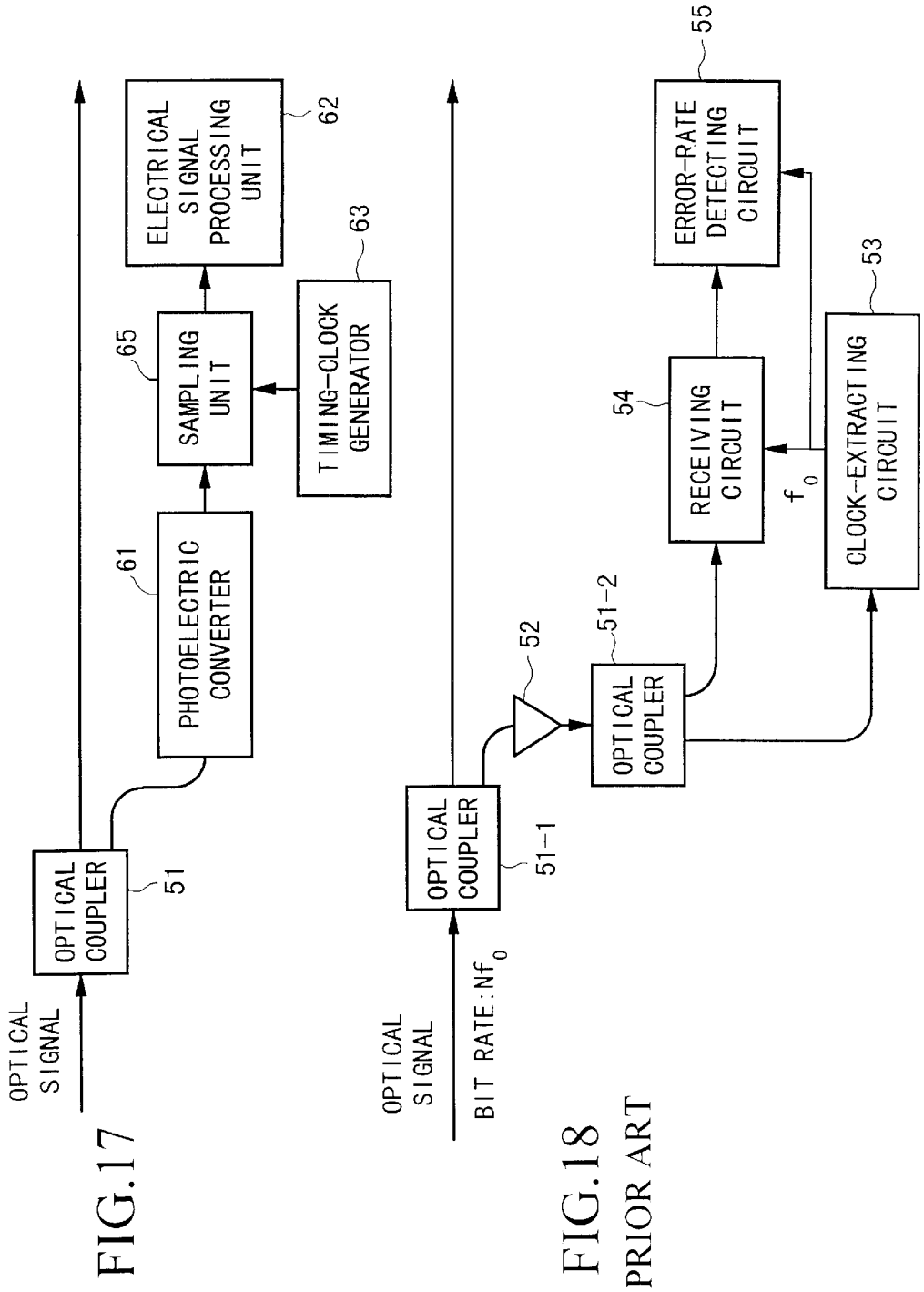
FIG. 17 is a block diagram showing the eighth embodiment of the optical signal quality monitoring system according to the present invention.
FIG. 18 is a block diagram showing an example of conventional systems for measuring an error rate.
Figure 19:
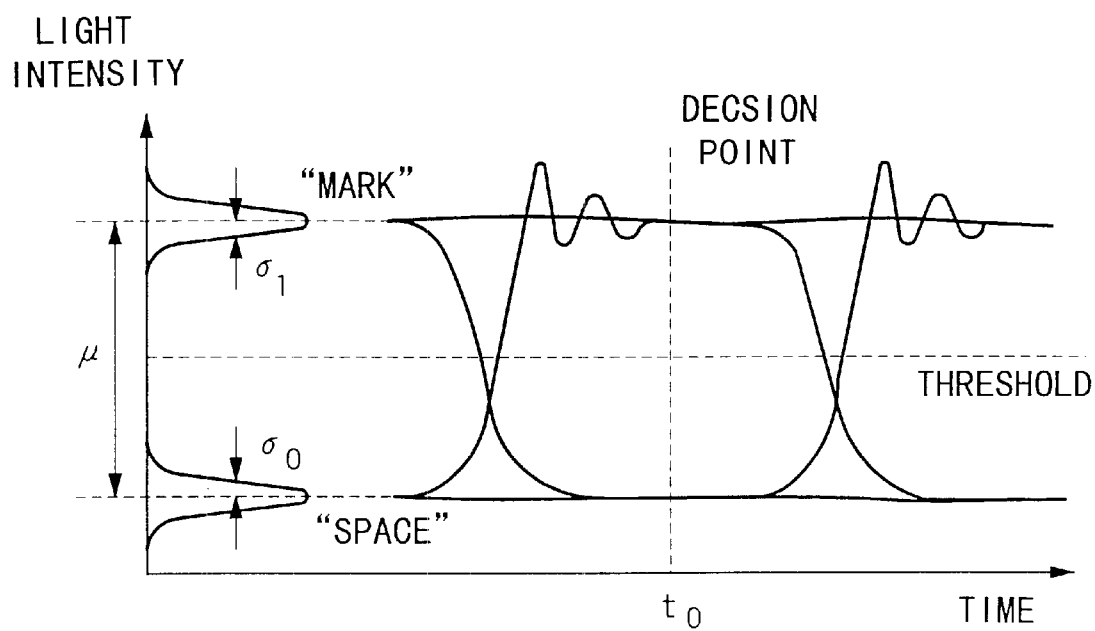
FIG. 19 is a diagram showing an eye diagram of an optical signal and a histogram indicating light intensity.
Figure 20:
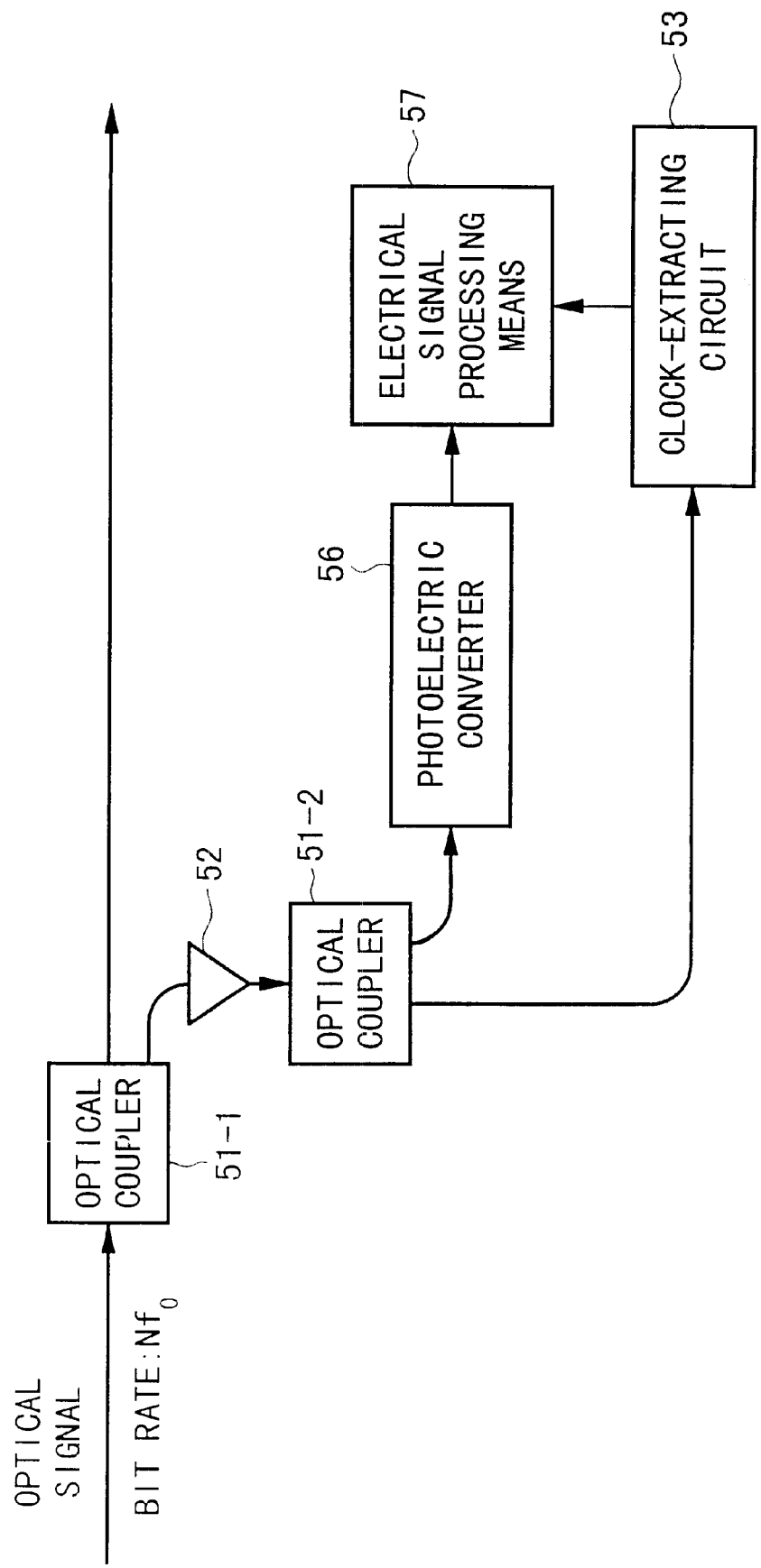
FIG. 20 is a diagram showing a system for measuring an eye diagram of the optical signal.

FIG. 17 shows the eighth embodiment of the system for monitoring the quality of an optical signal, according to the present invention.

In the figure, an optical signal having bit rate $N \cdot f_0$ (bit/s) which is N (natural number: 1, 2, . . . ) times as much as basic clock frequency $f_0$ (Hz) is input from a transmission path. A portion of this optical signal is separated by optical coupler 51. Preferably, the branch ratio of the monitor port (connected with the monitoring side) of the coupler to the other port connected with the transmission path is set to be as small as possible so as to prevent the transmission characteristics from degrading due to the power loss caused by the branch operation. The optical signal output from the monitor port is converted into an electrical signal by photoelectric converter 61, and is input into sampling unit 65. If the power of the optical signal input into the photoelectric converter 61 does not satisfy the necessary level, the signal may be amplified using an optical amplifier.

The timing-clock generator 63 generates a timing-clock signal of $f_0/n_1-\Delta f$ (Hz) or $f_0/n_1+\Delta f$ (Hz) ($n_1$=1, 2, . . . ) obtained by subtracting offset frequency $\Delta f$ (Hz) from or adding the offset frequency to "$f_0/n_1$". The internal structure of the timing-clock generator 63 may be that shown in FIG. 9A or 9B, or a structure composed only of an oscillator as shown in FIG. 9C. If the structure as shown in FIG. 9A is adopted, an optical coupler is inserted between the optical coupler 51 and the photoelectric converter 61 so that a separated component of the optical signal is input into the timing-clock generator 63. If the structure as shown in FIG. 9B is adopted, a network-synchronized clock signal is input into the timing-clock generator 63.

The sampling unit 65 performs sampling of the electrical signal using the above timing clock, and the amplitude histogram is measured and determined in the electrical signal processing unit 62. In the processing unit 62, with reference to each sampling point which constitutes the histogram, the difference between an average of the levels belonging to the "MARK" within a predetermined period and an average of the levels belonging to the "SPACE" within a predetermined period, and the sum of the standard deviations of the "MARK" and "SPACE" in each predetermined period are calculated. The temporally-averaged Q-factor is calculated using these calculated results, and the quality of the optical signal is examined.

The feature of the present embodiment is to perform electrical sampling using sampling unit 65, instead of optical sampling as shown in the above embodiments. Even in the arrangement of the present embodiment, the quality of an optical signal of any bit rate can be monitored as in the above embodiments. However, the bit rate of the optical signal to be monitored is limited to approximately a few dozen Gbit/s depending on bandwidths and processing speeds of the photoelectric converter and the electrical signal processing unit. That is, the present arrangement can be applied to optical fiber transmission networks whose maximum bit rate does not exceed the above limitation.

What is claimed is:

1. An optical signal quality monitoring system comprising:

sampling means for sampling an optical signal having a bit rate $N \cdot f_0$, that is, N times as much as basic clock frequency $f_0$ where N is a natural number, by using a pulse repetition frequency $f_0/n_1-\Delta f$ or $f_0/n_1+\Delta f$ where $n_1$ is a predetermined natural number and the pulse repetition frequency slightly differs from $f_0/n_1$ by $\Delta f$; and electrical signal processing means for determining an amplitude histogram of the light intensity of the optical signal based on results of the sampling, and regarding sampling points which constitute the histogram, the processing means extracting a set of higher-level points and a set of lower-level points and calculating a ratio of a difference between an average level of the set of higher-level points within a predetermined period and an average level of the set of lower-level points within a predetermined period, to the sum of standard deviations of both sets within each predetermined period, the calculated ratio being a coefficient of the S/N, so as to examine the quality of the optical signal based on the coefficient.

2. An optical signal quality monitoring system as claimed in claim 1, wherein:
the sampling means comprises:
sampling optical pulse generating means for generating a sampling optical pulse train having the pulse repetition frequency $f_0/n_1-\Delta f$ or $f_0/n_1+\Delta f$ which slightly differs from $f_0/n_1$ by $\Delta f$;
an optical multiplexer for multiplexing the optical signal and the sampling optical pulse train;
a nonlinear optical material for generating and outputting a cross-correlation optical signal caused by a nonlinear optical effect by using the optical signal and the sampling optical pulse train input from the optical multiplexer so that the optical signal is sampled by the sampling optical pulse train; and
a photoelectric converter for converting the cross-correlation optical signal into a cross-correlation electrical signal, and
wherein the electrical signal processing means determines the amplitude histogram based on the cross-correlation electrical signal.

3. An optical signal quality monitoring system as claimed in claim 1, wherein the sampling means comprises:
a photoelectric converter for converting the optical signal into an electrical signal;
timing-clock generating means for generating a timing-clock signal having the pulse repetition frequency $f_0/n_1-\Delta f$ or $f_0/n_1+\Delta f$ which slightly differs from $f_0/n_1$ by $\Delta f$; and
electrical-sampling means for performing sampling of levels of the electrical signal by using the timing-clock signal.

4. An optical signal quality monitoring system as claimed in one of claims 2 and 3, wherein:
regarding sampling points which constitute the histogram, the electrical signal processing means extracts a set of points whose levels are higher than a predetermined threshold level as the set of higher-level points, and extracts a set of points whose levels are lower than a predetermined threshold level as the set of lower-level points; and
the coefficient of the S/N is determined by calculating the following formula:

$$Q=\mu/(\sigma_1+\sigma_0)$$

which is a ratio of the difference $\mu$ between the average level of the set of higher-level points within a predetermined period and the average level of the set of lower-level points within a predetermined period, to the sum of standard deviations $(\sigma_1+\sigma_0)$ of both sets within each predetermined period.

5. An optical signal quality monitoring system as claimed in claim 4, wherein:
the electrical signal processing means determines the histogram with reference to sampling points measured within a predetermined period, and integrates the number of times of each sampling point from the side of the maximum level of the histogram, and when the integration result becomes equal to the following $N_{middle}$ at a certain level, this level is set as middle value $\mu_m$:

$$N_{middle}=N_{total}\times D\times M$$

where D means the duty ratio of the optical signal, and M means the mark ratio;
the electrical signal processing means examines each number of times from the side of the minimum level in the histogram, and when the number of times of sampling points has a peak value at the first time, the relevant level is determined as the average $\mu_0$ of the set of lower-level points; and
the predetermined threshold level $\mu_{th0}$ of the set of lower-level points and the predetermined threshold level $\mu_{th1}$ of the set of higher-level points are defined as follows:

$$\mu_{th0}=2\alpha\mu_m+(1-2\alpha)\mu_0$$

$$\mu_{th1}=2(1-\alpha)\mu_m-(1-2\alpha)\mu_0$$

where $0<\alpha<0.4$.

6. An optical signal quality monitoring system as claimed in one of claims 2 and 3, wherein:
regarding sampling points which constitute the histogram, the electrical signal processing means extracts a set of points whose levels belong to a predetermined higher-level section as the set of higher-level points, and extracts a set of points whose levels belong to a predetermined lower-level section as the set of lower-level points; and
the coefficient of the S/N is determined by calculating the following formula:

$$Q=\mu'/(\sigma_1+\sigma_0)$$

which is a ratio of the difference $\mu$ between the average level of the set of higher-level points within a predetermined period and the average level of the set of lower-level points within a predetermined period, to the sum of standard deviations $(\sigma_1+\sigma_0)$ of both sets within each predetermined period.

7. An optical signal quality monitoring system as claimed in claim 6, wherein:
the electrical signal processing means determines the histogram with reference to sampling points measured within a predetermined period, and integrates the number of times of each sampling point from the side of the maximum level of the histogram, and when the integration result becomes equal to the following $N_{middle}$ at a certain level, this level is set as middle value $\mu_m$:

$$N_{middle}=N_{total}\times D\times M$$

where D means the duty ratio of the optical signal, and M means the mark ratio;
the electrical signal processing means examines each number of times from the side of the minimum level in the histogram, and when the number of times of sampling points has a peak value at the first time, the relevant level is determined as the average $\mu_0$ of the set of lower-level points;
the predetermined threshold level $\mu_{th0}$ of the set of lower-level points and the predetermined threshold level $\mu_{th1}$ of the set of higher-level points are defined as follows:

$$\mu_{th0}=2\alpha\mu_m+(1-2\alpha)\mu_0$$

$$\mu_{th1}=2(1-\alpha)\mu_m-(1-2\alpha)\mu_0$$

where $0<\alpha<0.4$; and regarding the sampling points measured within the predetermined period, with the maximum level $\mu_{max}$ and the minimum level $\mu_{min}$, the range of the predetermined lower-level section is set to be $\mu_{min}$ or more to $\mu_{th0}$ or less, while the range of the predetermined higher-level section is set to be $\mu_{th1}$ or more to $\mu_{max}$ or less.

8. An optical signal quality monitoring system as claimed in claim 2, wherein the cross-correlation optical signal is a sum frequency light, or a difference frequency light, or a four-wave mixing light generated by a nonlinear optical effect.

9. An optical signal quality monitoring system as claimed in claim 2, wherein the sampling optical pulse generating means comprises:
  timing-clock generating means for generating a timing-clock signal having the pulse repetition frequency $f_0/n_1-\Delta f$ or $f_0/n_1+\Delta f$ obtained by subtracting offset frequency $\Delta f$ from or adding the offset frequency $\Delta f$ to $f_0/n_1$; and
  short-optical-pulse generating means for generating the sampling optical pulse train whose pulse width is sufficiently narrower than the time slot of the optical signal.

10. An optical signal quality monitoring system as claimed in one of claims 3 and 9, wherein the timing-clock generating means comprises:
  a frequency divider for frequency-dividing the basic clock frequency $f_0$ by $n_1$ so as to generate frequency $f_0/n_1$;
  an oscillator for generating an oscillation of the following offset frequency $\Delta f$:

$$\Delta f = f_0(n_1 + f_0 \delta T)/(n_1(n_1+n_2+f_0 \delta T))$$

where $n_2$ is a natural number and $\delta T$ is a sampling step time;
  a mixer for mixing the frequency-divided clock signal and an output from the oscillator, and generating a timing-clock signal of frequency $f_0/n_1 \pm \Delta f$; and
  a band-pass filter for outputting only one of the two frequency components of $f_0/n_1-\Delta f$ and $f_0/n_1+\Delta f$.

11. An optical signal quality monitoring system as claimed in claim 10, wherein:
  a portion of the optical signal separated from a transmission path through which the optical signal is transmitted is input into the timing-clock generating means, and
  the frequency divider divides the basic clock frequency $f_0$ of a clock signal extracted from the portion of the optical signal by $n_1$.

12. An optical signal quality monitoring system as claimed in claim 2, wherein the sampling optical pulse generating means comprises:
  timing-clock generating means for inputting a network-synchronized clock signal having clock frequency $f_0/m$ where $f_0$ is the basic clock frequency and m is a predetermined natural number, and for generating a timing-clock signal using the network-synchronized clock signal, the timing-clock signal having the pulse repetition frequency $f_0/n_1-\Delta f$ or $f_0/n_1+\Delta f$ obtained by subtracting offset frequency $\Delta f$ from or adding the offset frequency $\Delta f$ to $f_0/n_1$; and
  short-optical-pulse generating means for generating the sampling optical pulse train whose pulse width is sufficiently narrower than the time slot of the optical signal.

13. An optical signal quality monitoring system as claimed in one of claims 3 and 12, wherein the timing-clock generating means comprises:
  means for frequency-dividing or multiplying a network-synchronized clock signal having clock frequency $f_0/m$ where $f_0$ is the basic clock frequency and m is a predetermined natural number, so as to generate a signal of frequency $f_0/n_1$;
  an oscillator for generating an oscillation of the following offset frequency $\Delta f$:

$$\Delta f = f_0(n_1 + f_0 \delta T)/(n_1(n_1+n_2+f_0 \delta T))$$

where $n_2$ is a natural number and $\delta T$ is a sampling step time;
  a mixer for mixing the frequency-divided or multiplied clock signal and an output from the oscillator, and generating a timing-clock signal of frequency $f_0/n_1 \pm \Delta f$; and
  a band-pass filter for outputting only one of the two frequency components of $f_0/n_1-\Delta f$ and $f_0/n_1+\Delta f$.

14. An optical signal quality monitoring system as claimed in one of claims 3, 9, and 12, wherein the timing-clock generating means comprises:
  an oscillator for generating an oscillation of frequency $f_0/n_1-\Delta f$ or $f_0/n_1+\Delta f$ which is obtained by subtracting the following offset frequency $\Delta f$ or adding the offset frequency $\Delta f$ to $f_0/n_1$:

$$\Delta f = f_0(n_1 + f_0 \delta T)/(n_1(n_1+n_2+f_0 \delta T))$$

where $n_2$ is a natural number and $\delta T$ is a sampling step time.

15. An optical signal quality monitoring system as claimed in one of claims 9 and 12, further comprising an optical coupler for separating a portion of the optical signal from a transmission path through which the optical signal is transmitted, and
  wherein the optical multiplexer multiplexes the portion of the optical signal separated by the optical coupler and the sampling optical pulse train output from the sampling optical pulse generating means.

16. An optical signal quality monitoring system as claimed in claim 15, wherein:
  the optical multiplexer comprises polarization-splitting and multiplexing means for splitting the optical signal into two orthogonal polarization components Psig. p and Psig. s and also splitting the sampling optical pulse train into two orthogonal polarization components Psam. p and Psam. s, and for polarization-multiplexing orthogonal components Psig. s and Psam. p with each other, and also polarization-multiplexing orthogonal components Psig. p and Psam. s with each other, and outputting the multiplexed signals from two output ports, and
  the monitoring system comprises:
  dual nonlinear optical materials and photoelectric converters for generating cross-correlation optical signals with respect to each of the dual polarization-multiplexed optical signals output from the polarization-splitting and multiplexing means, and converting each cross-correlation optical signal into a cross-correlation electrical signal; and
  an adding circuit for adding the dual cross-correlation electrical signals and outputting the added signal into the electrical signal processing means.

17. An optical signal quality monitoring system as claimed in claim 15, wherein:
  the optical multiplexer comprises polarization-splitting and multiplexing means for splitting the optical signal into two orthogonal polarization components Psig. p and Psig. s and also splitting the sampling optical pulse train into two orthogonal polarization components Psam. p and Psam. s, and for polarization-multiplexing orthogonal components Psig. s and Psam. p with each other, and also polarization-multiplexing orthogonal components Psig. p and Psam. s with each other, and outputting the multiplexed signals from two output ports, and the monitoring system comprises:

dual nonlinear optical materials for generating cross-correlation optical signals with respect to each of the dual polarization-multiplexed optical signals output from the polarization-splitting and multiplexing means; and polarization-multiplexing means for matching timing situations of the dual cross-correlation optical signals and polarization-multiplexing these optical signals, and outputting the multiplexed signal into the photoelectric converter.

18. An optical signal quality monitoring system as claimed in one of claims 9 and 12, wherein:

the optical multiplexer and the nonlinear optical material are inserted into the transmission path through which the optical signal is transmitted;

the optical signal from the transmission path and the sampling optical pulse train output from the sampling optical pulse generating means are multiplexed by the optical multiplexer and the multiplexed signal is input into the nonlinear optical material; and the monitoring system comprises wavelength-division demultiplexing means, inserted into the transmission path, for demultiplexing the optical signal and the cross-correlation optical signal output from the nonlinear optical material, and outputting the separated optical signal into the transmission path and outputting the separated cross-correlation optical signal into the photoelectric converter.

19. An optical signal quality monitoring system as claimed in claim 18, wherein:

the optical multiplexer comprises polarization-splitting and multiplexing means for splitting the optical signal into two orthogonal polarization components Psig. p and Psig. s and also splitting the sampling optical pulse train into two orthogonal polarization components Psam. p and Psam. s, and for polarization-multiplexing orthogonal components Psig. s and Psam. p with each other, and also polarization-multiplexing orthogonal components Psig. p and Psam. s with each other, and outputting the multiplexed signals from two output ports, and the monitoring system comprises:

dual nonlinear optical materials and wavelength-division demultiplexing means for generating cross-correlation optical signals with respect to each of the dual polarization-multiplexed optical signals output from the polarization-splitting and multiplexing means, and for dividing the signal in each of the dual lines into the optical signal and the cross-correlation optical signal;

polarization-multiplexing means for matching timing situations of the dual optical signals and polarization-multiplexing these optical signals, and outputting the multiplexed signal into the transmission path;

dual photoelectric converters for converting the dual cross-correlation optical signals into cross-correlation electrical signals; and an adding circuit for adding the dual cross-correlation electrical signals and outputting the added signal into the electrical signal processing means.

20. An optical signal quality monitoring system as claimed in claim 18, wherein:

the optical multiplexer comprises polarization-splitting and multiplexing means for splitting the optical signal into two orthogonal polarization components Psig. p and Psig. s and also splitting the sampling optical pulse train into two orthogonal polarization components Psam. p and Psam. s, and for polarization-multiplexing orthogonal components Psig. s and Psam. p with each other, and also polarization-multiplexing orthogonal components Psig. p and Psam. s with each other, and outputting the multiplexed signals from two output ports, and the monitoring system comprises:

dual nonlinear optical materials and wavelength-division demultiplexing means for generating cross-correlation optical signals with respect to each of the dual polarization-multiplexed optical signals output from the polarization-splitting and multiplexing means, and dividing the signal in each of the dual lines into the optical signal and the cross-correlation optical signal;

first polarization-multiplexing means for matching timing situations of the dual optical signals and polarization-multiplexing these optical signals, and outputting the multiplexed signal into the transmission path; and second polarization-multiplexing means for matching timing situations of the dual cross-correlation optical signals and polarization-multiplexing these optical signals, and outputting the multiplexed signal into the photoelectric converter.

* * * * *